United States Patent
Matsumura

(10) Patent No.: US 8,360,891 B2
(45) Date of Patent: *Jan. 29, 2013

(54) GAME DEVICE, GAME PROCESSING METHOD, INFORMATION RECORDING MEDIUM, AND PROGRAM

(75) Inventor: Kazuaki Matsumura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 198 days.

This patent is subject to a terminal disclaimer.

(21) Appl. No.: 12/809,970

(22) PCT Filed: Dec. 17, 2008

(86) PCT No.: PCT/JP2008/073011
§ 371 (c)(1),
(2), (4) Date: Jun. 21, 2010

(87) PCT Pub. No.: WO2009/081823
PCT Pub. Date: Jul. 2, 2009

(65) Prior Publication Data
US 2010/0292008 A1     Nov. 18, 2010

(30) Foreign Application Priority Data
Dec. 21, 2007 (JP) ................. 2007-330637

(51) Int. Cl.
*A63F 13/00* (2006.01)
(52) U.S. Cl. ............................. 463/43; 463/42
(58) Field of Classification Search .............. 463/40–43, 463/25–36
See application file for complete search history.

(56) References Cited

U.S. PATENT DOCUMENTS

| 6,217,446 B1 | 4/2001 | Sanbongi et al. |
| 6,371,856 B1 | 4/2002 | Niwa |

(Continued)

FOREIGN PATENT DOCUMENTS

| EP | 1010444 A1 | 6/2000 |
| JP | 10-165647 | 6/1998 |

(Continued)

OTHER PUBLICATIONS

European Search Report dated Apr. 13, 2011.

(Continued)

*Primary Examiner* — Masud Ahmed
(74) *Attorney, Agent, or Firm* — Howard & Howard Attorneys PLLC

(57) ABSTRACT

In a game device (200), a memory unit (201) stores a position of a player character, a position of an enemy character, an elapsed time up to a present time after the enemy character has appeared, and candidates of a position where a new enemy character is to appear. A measuring unit (202) measures an elapsed time up to a present time after the enemy character has appeared, and stores the measured elapsed time in the memory unit (201). A calculating unit (203) calculates a reference distance which becomes a determination criterion for a position where a new enemy character appears based on the stored elapsed time. The reference distance monotonically increases relative to the increasing of the elapsed time. An appearance setting unit (204) selects a candidate having a distance to the player character closest to the reference distance among the candidates stored in the memory unit (201), and causes a new enemy character to appear at the selected candidate position.

18 Claims, 19 Drawing Sheets

U.S. PATENT DOCUMENTS

| | | | |
|---|---|---|---|
| 2003/0158827 A1* | 8/2003 | Ansari et al. | 706/12 |
| 2004/0110560 A1* | 6/2004 | Aonuma | 463/32 |
| 2005/0026684 A1* | 2/2005 | Sumi et al. | 463/31 |
| 2006/0094503 A1* | 5/2006 | Ajioka et al. | 463/32 |
| 2006/0252535 A1* | 11/2006 | Ishihata et al. | 463/32 |
| 2007/0060342 A1* | 3/2007 | Sakaguchi et al. | 463/31 |
| 2007/0066403 A1* | 3/2007 | Conkwright | 463/43 |
| 2010/0041483 A1 | 2/2010 | Kobayashi | |

FOREIGN PATENT DOCUMENTS

| | | |
|---|---|---|
| JP | 11-053570 A | 2/1999 |
| JP | 200300948 A | 1/2003 |
| JP | 2003/334382 A | 11/2003 |
| JP | 2004/160059 A | 6/2004 |
| JP | 2004-337305 | 12/2004 |
| JP | 2006/059381 A | 3/2006 |
| TW | 575449 | 2/2004 |
| TW | 1243703 | 11/2005 |
| WO | 2006/112087 A1 | 10/2006 |
| WO | 2008/032454 | 3/2008 |

OTHER PUBLICATIONS

International Search Report for Patent Application No. PCT/JP2008/073011 with English Translation mailed on Mar. 17, 2009, 2 pages.

Office Action dated Feb. 1, 2012 for U.S. Appl. No. 12/441,134, filed Mar. 12, 2009.

Office Action of Jun. 6, 2009 for the counterpart Taiwanese Patent Application No. 096104388 and English translation of Office Action, 12 pages.

Supplemental European Search Report for Patent Application No. EP07707845.9, mailed Mar. 22, 2010, 6 pages.

International Search Report for PCT/JP2007/051659 dated Feb. 1, 2007.

* cited by examiner

FIG.3A

| POSITION OF PLAYER CHARACTER |
|---|
| (PX, PY, PZ) |

FIG.3B

| IDENTIFICATION INFORMATION | POSITION OF ENEMY CHARACTER |
|---|---|
| 0001 | (E1X, E1Y, E1Z) |
| 0002 | (E2X, E2Y, E2Z) |
| ... | ... |

FIG.3C

| IDENTIFICATION INFORMATION | CANDIDATE LIST | | | |
|---|---|---|---|---|
| | FIRST CANDIDATE | SECOND CANDIDATE | ... | ... |
| 0001 | X1, Y1, Z1 | X2, Y2, Z2 | ... | ... |
| 0002 | AREA 1 | AREA 2 | ... | ... |
| ... | ... | ... | ... | ... |

| IDENTIFICATION INFORMATION | POSITION OF ENEMY CHARACTER | ELAPSED TIME |
|---|---|---|
| ABCD | E1X, E1Y, E1Z | ○○MINUTE △△ SECOND ×× |
| EFGH | E2X, E2Y, E2Z | VSYNC × TIMES |
| ... | ... | ... |

FIG.16A

| IDENTIFICATION INFORMATION | POSITION OF ENEMY CHARACTER | APPEARANCE TIME |
|---|---|---|
| ABCD | E1X, E1Y, E1Z | ○○HOUR ○○MINUTE ○○SECOND ○○ |
| EFGH | E2X, E2Y, E2Z | AT x-TH INTERRUPTION |
| ... | ... | ... |

FIG.16B

| IDENTIFICATION INFORMATION | POSITION OF ENEMY CHARACTER | BATTLE START TIME |
|---|---|---|
| ABCD | (E1X, E1Y, E1Z) | (NON-BATTLING STATE) |
| EFGH | (E2X, E2Y, E2Z) | ××HOUR ××MINUTE ××SECOND ×× |
| ... | ... | ... |

FIG.19

GAME DEVICE, GAME PROCESSING METHOD, INFORMATION RECORDING MEDIUM, AND PROGRAM

TECHNICAL FIELD

The present invention relates to a game device, a game processing method, an information recording medium, and a program which are appropriate for adjusting a game so that the game does not become too difficult or too easy for a player.

BACKGROUND ART

There are games in which a player operates a player character to defeat an enemy character in a virtual game space using a virtual gun or a sword. For example, when an enemy character appears, the player moves the player character to that position, or aims at that position to defeat the enemy character. Moreover, when the player character is found by an enemy character, the game does not advance in some cases if the player does not defeat that enemy character. In most games, when the player defeats an enemy character, another enemy character newly appears, so that the player cannot complete the game if the player does not defeat enemy characters appearing in sequence. Game devices appropriately allow a new enemy character to appear in accordance with the position, level, etc. of the player character to make the development of the game more amusing, thereby attracting the player's interest.

For example, [Patent Literature 1] discloses a game system that controls the number of enemy characters, the strength thereof, etc. based on the number of players participating in a game or the level of the player character, thereby making the game more amusing without largely deteriorating the game's balance.

Moreover, [Patent Literature 2] discloses a game device that refers to a player's character activity history, and changes the rate of recurrence of enemy characters depending on a position. For example, if a period after the player character starts standing by at a predetermined hole up to a present time is long, the appearance probability of an enemy character at that hole is decreased.

Patent Literature 1: Unexamined Japanese Patent Application KOKAI Publication No. 2004-160059
Patent Literature 2: Unexamined Japanese Patent Application KOKAI Publication No. H11-53570

DISCLOSURE OF INVENTION

Problem to be Solved by the Invention

According to conventional game devices, however, a position where an enemy character newly appears is a preset position or is selected at random, so that enemy characters may successively appear near the player character. This causes a beginner player to feel that the difficulty level of the game is high (enemy characters are strong) regardless of the level of the game and the story development, or to feel that the game is unfair and results in taking the player's interest out of the game. Moreover, enemy characters often appear only at positions far apart from the player character. This causes an expert player to feel that the difficulty level is low (enemy characters are weak) regardless of the level of the game and the story development, resulting in taking the player's interest out of the game.

The present invention has been made to overcome such problems, and it is an object of the present invention to provide a game device, a game processing method, an information recording medium, and a program which are appropriate for adjusting a game so that the game does not become too difficult or too easy for a player.

Means for Solving the Problem

In order to accomplish the above-explained object, the following invention will be disclosed based on the principle of the present invention.

A game device according to a first aspect of the present invention comprises a memory unit, a measuring unit, a calculating unit, an appearance determining unit, and an appearance setting unit.

The memory unit stores a position of a player character moving in a virtual space in accordance with an instruction from a player, a position of an enemy character, an elapsed time up to a present time after the enemy character has appeared in the virtual space, and candidates of a position where a new enemy character is to appear in the virtual space.

The measuring unit measures the elapsed time and stores the measured elapsed time in the memory unit.

The calculating unit calculates a distance monotonically increasing relative to the stored elapsed time.

The appearance determining unit determines whether to cause a new enemy character to appear in the virtual space.

The appearance setting unit, when the appearance determining unit determines to cause the new enemy character to appear, stores, as a position where an enemy character may newly appear, a candidate position having a distance to the player character that is nearest to the calculated distance in the memory unit among all stored candidate positions that are positions where an enemy character may newly appear and causes the new enemy character to appear.

The player plays a game of operating the player character to fight against an enemy character, etc. The enemy character may be a character like a monster which moves in the virtual space and attacks the player character, or may be one like a land mine which is unmovable. The timing of the enemy character's appearance varies. For example, the upper limit of a total number of enemy characters present in the game is set beforehand, and enemy characters appear at arbitrary timings in the game within a range not exceeding the upper limit. For example, when an enemy character already present in the virtual space loses a battle against the player character and disappears, another new enemy character appears. Moreover, for example, when the player character improves its skill or reaches a predetermined position, an enemy character may appear.

The game device of the present invention stores player character information indicating a position of the player character and enemy character information indicating a position of an enemy character. Moreover, the game device measures an elapsed time up to a present time after an enemy character is caused to appear in the virtual space, and stores the measured elapsed time. When there are multiple enemy characters, an elapsed time for each enemy character is stored. The elapsed time indicates how long each enemy character appears (is living).

When the time of causing an enemy character to appear comes, the game device reads the stored elapsed time, and calculates a distance (hereinafter, "reference distance") which increases as the read elapsed time increases. The reference distance becomes a determination criterion to determine how much closer a current position where an enemy character is caused to appear is set relative to a current position of the player character. More specifically, candidates of a position where an enemy character is to appear are set beforehand. The game device causes a new enemy character to appear at a candidate position having a distance to the player character closest to the reference distance among the preset candidate positions.

That is, the longer an enemy character already present survives, the farther a new enemy character appears from the player character. Conversely, the shorter an enemy character already present survives, the nearer a new enemy character appears to the player character.

For example, when the game proficiency of the player is low or when the offensive power of the player character is low, there is a general tendency for the lifetime of an enemy character to last long. Hence, according to the present invention, when it is presumed that the proficiency of the player (or the player character) is low, a new enemy character is likely to appear at a position far from the player character. Therefore, it is possible for the game device to control the game so as to prevent enemy characters from sequentially appearing only near the player character when the proficiency of the player is still low, and to prevent the game from becoming too difficult for a beginner player.

Moreover, for example, when the game proficiency of the player is high or when the offensive power of the player character is high, there is a general tendency for the lifetime of an enemy character to be short. Hence, according to the present invention, when it is presumed that the proficiency of the player (or the player character) is high, a new enemy character is likely to appear at a position near the player character. Therefore, it is possible for the game device to control the game so as to prevent enemy characters from appearing at positions far from the player character when the proficiency of the player is high, and to prevent the game from becoming too easy for an expert player.

The calculating unit may calculate an average elapsed time associated with respective enemy characters present in the virtual space, and may calculate a distance which monotonically increases relative to the calculated average.

For example, when multiple enemy characters are present (still alive), the game device may calculate a reference distance based on any one of elapsed times of respective enemy characters, but may calculate the reference distance based on an average elapsed time of respective enemy characters.

If only one enemy character is taken into consideration right before it's time of appearance, if the player character has difficulty defeating individual enemy characters overall but incidentally and luckily defeats an enemy character having appeared recently within a short time, it is possible that a new enemy character appears nearby the player character. In other words, if the lifetime of an enemy character can be taken as a statistical singular point, it is desirable to calculate the reference distance based on an average time instead of the elapsed time of that enemy character. Hence, according to the present invention, any effect of a singular point can be suppressed, and an enemy character is caused to appear in accordance with the tendency of the game proficiency of the player.

The calculating unit may calculate a distance which monotonically increases relative to the longest elapsed time among elapsed times associated with respective enemy characters present in the virtual space.

For example, with multiple enemy characters being present, the longer the elapsed time of the enemy character that survives the longest (longest lifetime) becomes, i.e. the longer the longest survival time becomes among the survival times of enemy characters already present, the farther a new enemy character appears from the player character. That is, when there is an enemy character that the player character cannot defeat for a long time, a new enemy character appears at a position farther from the player character. Accordingly, the game device can adjust the difficulty level of the game in accordance with the tendency of the game proficiency of the player.

The calculating unit may calculate a distance which monotonically increases relative to a shortest elapsed time among elapsed times associated with respective enemy characters present in the virtual space.

For example, with multiple enemy characters being present, the longer the elapsed time of an enemy character that survives for the shortest time (the lifetime is short) becomes, i.e. the longer the shortest survival time becomes among the survival times of enemy characters already present, the farther a new enemy character appears at a position from the player character. For example, when the survival time of an enemy character having appeared at a time closest to the present time (most recently) is short, it can be presumed that the player is good at the game, so that a new enemy character is caused to appear nearer to the player character. Moreover, when the survival time of an enemy character having appeared recently is long, it can be presumed that the player is not good at the game, so that a new enemy character is caused to appear farther from the player character. Accordingly, the game device can adjust the difficulty level of the game in accordance with the tendency of the proficiency of the player.

The game device may further comprise a state setting unit, a disappearance determining unit, and a disappearance setting unit.

The state setting unit causes the player character to be in a battling state when a position of an enemy character is within a predetermined distance range from a position of the player character, and causes the player character to be in a non-battling state in other cases.

The disappearance determining unit determines whether to cause the enemy character to disappear based on an instruction input from the player when the player character is in a battling state.

The disappearance setting unit causes the enemy character to disappear from the virtual space when the disappearance determining unit determines to cause the enemy character to disappear.

The game includes a battling state between the player character and an enemy character and a non-battling state in other cases. For example, when a position of an enemy character is within a predetermined distance range from the position of the player character, the player character transitions to a battling state against that enemy character, and the game is changed to battling mode. In the battling mode, the victory or defeat of the battle depends on instruction input from the player or the size of attribute parameters, such as offensive power, defensive power, or vital power of the player character.

The timing that an enemy character present in the virtual space disappears varies.

For example, as a result of a battle against the player character, when a predetermined attribute parameter (a so-called vital power, a physical strength, a hit point or the like) of an enemy character becomes zero in first, the enemy character loses and disappears.

Moreover, for example, when an enemy character which disappears after a predetermined time elapses (because it is activated) like a time bomb is employed, when a predetermined time elapses after the enemy character (time bomb) is arranged, the enemy character (explodes and) disappears.

Furthermore, as a result of movement of the player character in the virtual space, when an enemy character already present is located too far away from the player character so that the enemy character hardly contacts the player character or cannot be displayed within a screen, presence of that enemy character becomes meaningless, so that such an enemy character can be caused to disappear.

According to the present invention, the game device can appropriately cause an enemy character to disappear in accordance with advancement of the game or the story. Moreover, the game device can adjust the number of enemy characters so that the game does not become too difficult or too easy for the player.

The appearance determining unit may determine when a new enemy character should appear while the disappearance setting unit causes an enemy character to disappear.

That is, as an example timing when an enemy character appears, a scheme of causing a new enemy character to appear after an enemy character already present disappears can be adopted. For example, when the player character wins a battle against an enemy character and the enemy character disappears, another enemy character appears in the virtual space. Hence, the player advancing the game while considering when to defeat an enemy character should be appropriate from a strategical standpoint, the game device can adjust the difficulty level while reflecting the strategy planed by the player on the game.

The appearance determining unit may determine whether to cause a new enemy character to appear using a random number.

That is, a timing that an enemy character appears may be arbitrary based on a random number. The random number may be generated on a case-by-case basis using, for example, a time as a seed, or a random number table prepared beforehand may be used. The game device can adjust the difficulty level regardless of the strategy planned by the player.

The appearance determining unit may determine to cause a new enemy character to appear when a total number of enemy characters present in the virtual space is less than a predetermined upper limit.

For example, if the number of enemy characters which can appear in the virtual space is unlimited, there is a possibility that the game becomes too difficult for the player. However, the game device can adjust the difficulty level of the game by providing the predetermined upper limit.

The appearance determining unit may change the upper limit in accordance with an elapsed time in a game executed by the game device.

The upper limit of the number of enemy characters which can appear in the virtual space may be a fixed value, but may be a variable value. An example of adopting a variable value is a scheme of increasing/decreasing the upper limit as a longer time in game execution elapses. When a time in the game being executed matches a real time, the longer the real play time of the game, the more the number of enemy characters to appear increases or decreases. For example, the upper limit is decreased for a beginner player who is expected to have a longer play time, and the upper limit is increased for an expert player who is expected to have a shorter play time. Accordingly, the game device can adjust the difficulty level of the game in accordance with the proficiency of the player. Note that the longer the play time is, the more the upper limit may be increased even for a beginner player.

The appearance determining unit may change the upper limit in accordance with a number of enemy characters caused to disappear by the disappearance setting unit.

Another example of adopting a variable upper limit is a scheme of increasing (or decreasing) the upper limit the more as the player character defeats enemy characters the more. For example, the upper limit is increased for an expert player who is expected to defeat a larger number of enemy characters within a predetermined time, and the upper limit is decreases for a beginner player who is expected to defeat a smaller number of enemy characters within a predetermined time. Accordingly, the game device can adjust the difficulty level of the game in accordance with the proficiency of the player.

The memory unit may store an elapsed time until the disappearance setting unit causes an enemy character to disappear after the state setting unit causes the enemy character to be in a battling state, instead of storing an elapsed time up to a present time after the enemy character has appeared in the virtual space.

An elapsed time up to a present time after an enemy character has appeared in the virtual space is a survival time indicating how long the enemy character survives as explained above. Conversely, an elapsed time after the state setting unit causes an enemy character to be in a battling state until the disappearance setting unit causes the enemy character to disappear is a battling time of the player character against the enemy character.

That is, according to the present invention, a new enemy character appears near the player character or far from the player character depending on the length of the battling time. For example, the longer a battle of the player character against an enemy character becomes, the farther a new enemy character appears from the player character. Moreover, the shorter the battling time is, the nearer a new enemy character appears. It is possible to presume the game proficiency of the player (or the player character) from the length of the battling time, allowing the game device to adjust the game so that the game does not become too easy or too difficult for the player.

The game device may further comprise a moving unit which, when a distance between the position of the player character and the position of the enemy character is equal to or less than a predetermined value, moves a position of an enemy character so that the enemy character comes closer to a position of the player character, and updates the position of the enemy character stored in the memory unit.

For example, an enemy character freely moving in the virtual space moves so as to come closer to the player character when the distance from the player character to the enemy character becomes equal to or less than the predetermined distance. According to the present invention, the game device can adjust the game so that the game does not become too easy or too difficult for the player. It is very unlikely that factors arise that give difficulties for an expert player to go clear the game become extremely little. It also does not happen a case in which factors that gives difficulties for a beginner player to go clear the game become excessive.

The game device may further comprise a moving unit which moves a position of an enemy character at random, and updates the position of the enemy character stored in the memory unit, while at the same time, (a) sets a probability that the enemy character moves toward a direction of a position of the player character from the position of the enemy character to be relatively larger than a probability that the enemy character moves in other directions when a distance between the position of the player character and the position of the enemy character is equal to or less than a predetermined value, and (b) sets the probability that the enemy character moves toward the direction of the position of the player character from the position of the enemy character to be equal to the probability that the enemy character moves in other directions when the distance between the position of the player character and the position of the enemy character is greater than the predetermined value.

For example, an enemy character can move in the virtual space in a random-walk manner. When the distance from the player character to the enemy character is larger than the predetermined distance, the probabilities that the enemy character moves are equal for all directions in which the enemy character is movable. Conversely, when the distance from the player character to the enemy character is equal to or less than the predetermined distance, the probability that the enemy character moves from the position thereof to the position of the player character becomes relatively larger than the probabilities of other directions. According to the present invention, the game device can adjust the game so that the game does not become too easy or too difficult for the player. It does not happen a case in which factors that give difficulties for an expert player to go clear the game become extremely little. It also does not happen a case in which factors that give difficulties for a beginner player to go clear the game become excessive.

The moving unit may move an enemy character at a speed equal to or slower than a predetermined maximum moving speed.

That is, an upper limit may be set for the moving speed of a movable enemy character.

For example, when an appearing time of an enemy character or a battling time against an enemy character is long, a new character appears farther from the player character. However, when the moving speed of an enemy character toward the player character is too fast, the game becomes rather difficult for a beginner player.

Moreover, when an appearing time of an enemy character or a battling time against an enemy character is short, a new enemy character appears nearer the player character. Furthermore, when the moving speed of an enemy character toward the player character is fast, the game becomes unreasonably difficult for an expert player.

According to the present invention, however, the longer (shorter) the appearing time of an enemy character or the battling time against an enemy character is, the longer (shorter) the game device sets a time until a battle starts, and can adjust the game so that the game does not become too easy or too difficult for the player.

The moving unit may move an enemy character at a speed equal to or faster than a predetermined minimum moving speed.

That is, a lower limit may be set for the moving speed of a movable enemy character.

For example, when an appearing time of an enemy character or a battling time against an enemy character is long, a new character appears farther from the player character. Moreover, when the moving speed of an enemy character toward the player character is too slow, the game becomes too easy for a beginner player.

Moreover, when an appearing time of an enemy character or a battling time against an enemy character is short, a new enemy character appears nearer the player character. However, when the moving speed of an enemy character toward the player character is slow, the game becomes too easy for an expert player.

According to the present invention, however, the longer (shorter) the appearing time of an enemy character or the battling time against an enemy character is, the longer (shorter) the game device sets a time until a battle starts. The game device can adjust the game so that the game does not become too easy or too difficult for the player.

A game processing method according to another aspect of the present invention is executed by a game device including a memory unit, and comprises a measuring step, a calculating step, an appearance determining step, and an appearance setting step.

The memory unit stores a position of a player character moving in a virtual space in accordance with an instruction from a player, a position of an enemy character, an elapsed time up to a present time after the enemy character has appeared in the virtual space, and candidates of a position where a new enemy character is to appear in the virtual space.

In the measuring step, the elapsed time is measured and stored in the memory unit.

In the calculating step, a distance monotonically increasing relative to the stored elapsed time is calculated.

In the appearance determining step, it is determined whether to cause a new enemy character to appear in the virtual space.

In the appearance setting step, as a position where an enemy character newly appears, a candidate position having a distance to the player character closest to the calculated distance is stored in the memory unit among the stored candidate positions of where an enemy character is to reappear, and the new enemy character is caused to appear, when it is determined in the appearance determining step to cause the new enemy character to appear.

That is, the longer another enemy character already present survives, the farther a new enemy character appears from the player character. Conversely, the shorter another enemy character already present survives, the nearer a new enemy character appears to the player character.

For example, when the game proficiency of the player is low or when the offensive power of the player character is low, there is a general tendency for the lifetime of an enemy character to be long. Hence, according to the present invention, as a new enemy character is likely to appear at a position far from the player character, it is possible for the game device to control the game so as to prevent enemy characters from sequentially appearing only near the player character when the proficiency of the player is still low, and to prevent the game from becoming too difficult for a beginner player.

Moreover, for example, when the game proficiency of the player is high or when the offensive power of the player character is high, there is a general tendency for the lifetime of an enemy character to be short. Hence, according to the present invention, as a new enemy character is likely to appear at a position near the player character, it is possible for the game device to control the game to prevent enemy characters from appearing merely positions far from the player character when the proficiency of the player is high, and to prevent the game from becoming too easy for an expert player.

A computer-readable information recording medium according to the other aspect of the present invention causes a computer to function as a memory unit, a measuring unit, a calculating unit, an appearance determining unit, and an appearance setting unit.

The memory unit stores a position of a player character moving in a virtual space in accordance with an instruction from a player, a position of an enemy character, an elapsed time up to a present time after the enemy character has appeared in the virtual space, and candidates of a position where a new enemy character is to appear in the virtual space.

The measuring unit measures the elapsed time and stores the measured elapsed time in the memory unit.

The calculating unit calculates a distance monotonically increasing relative to the stored elapsed time.

The appearance determining unit determines whether to cause a new enemy character to appear in the virtual space.

The appearance setting unit, when the appearance determining unit determines to cause the new enemy character to appear, stores, as a position where an enemy character newly appears, a candidate having a distance to the player character closest to the calculated distance in the memory unit among the stored candidates of a position where an enemy character is to newly appear and causes the new enemy character to appear.

According to the present invention, a computer can function as the game device which operates as explained above.

A program according to still other aspect of the present invention causes a computer to function as a memory unit, a measuring unit, a calculating unit, an appearance determining unit, and an appearance setting unit.

The memory unit stores a position of a player character moving in a virtual space in accordance with an instruction from a player, a position of an enemy character, an elapsed time up to a present time after the enemy character has appeared in the virtual space, and candidate positions where a new enemy character is to appear in the virtual space.

The measuring unit measures the elapsed time and stores the measured elapsed time in the memory unit.

The calculating unit calculates a distance monotonically increasing relative to the stored elapsed time.

The appearance determining unit determines whether to cause a new enemy character to appear in the virtual space.

The appearance setting unit, when the appearance determining unit determines to cause the new enemy character to appear, stores, as a position where an enemy character newly appears, a candidate having a distance to the player character closest to the calculated distance in the memory unit among the stored candidates of a position where an enemy character is to newly appear, and causes the new enemy character to appear.

According to the present invention, the program allows a computer to function as the game device which operates as explained above.

The program of the present invention can be stored in a computer-readable information memory medium, such as a compact disk, a flexible disk, a hard disk, a magneto-optical disk, a digital video disk, a magnetic tape, or a semiconductor memory.

The foregoing program can be distributed and sold independently from a computer which executes that program via a computer communication network. Moreover, the information memory medium can be distributed and sold independently from the computer.

Effect of the Invention

According to the present invention, there are provided a game device, a game processing method, an information recording medium, and a program which are appropriate for adjusting a game so that the game does not become too difficult or too easy for a player.

BRIEF DESCRIPTION OF DRAWINGS

FIG. 3A is a diagram showing an example configuration of data indicating a position of a player character;

FIG. 3B is a diagram showing an example configuration of data indicating a position of an enemy character;

FIG. 3C is a diagram showing an example configuration of data indicating a candidate of a position when an enemy character is caused to appear;

FIG. 16A is a diagram showing an example configuration of enemy character information stored in a memory unit;

FIG. 16B is a diagram showing an example configuration of enemy character information stored in a memory unit;

FIG. 19 is a diagram showing an example configuration of enemy character information stored in a memory unit in eighth embodiment.

DESCRIPTION OF REFERENCE NUMERALS

Figure 1:
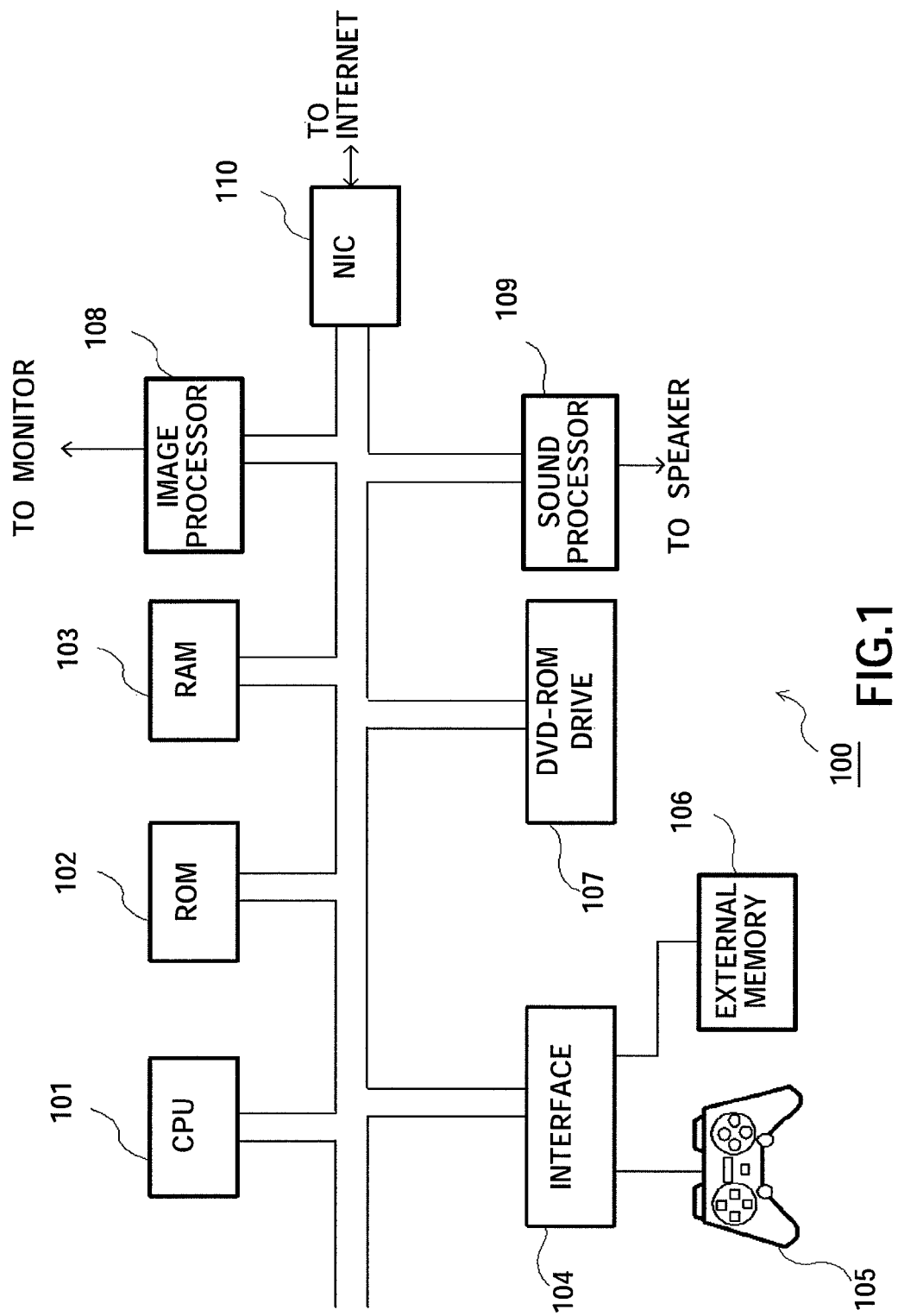
FIG. 1 is a diagram showing a general configuration of a typical information processing device which realizes a game device of the present invention.

100 Information processing device
101 CPU
102 ROM
103 RAM
104 Interface
105 Controller
106 External memory
107 DVD-ROM drive
108 Image processor
109 Sound processor 110 NIC
200 Game device
201 Memory unit
202 Measuring unit
203 Calculating unit
204 Appearance setting unit
205 Receiving unit
206 Moving unit
207 Deleting unit
208 Output unit
209 Appearance determining unit
210 Disappearance determining unit
211 Disappearance setting unit
212 State setting unit

BEST MODE FOR CARRYING OUT THE
INVENTION

First Embodiment

Embodiments of the present invention will now be explained. For ease of understanding, embodiments of the present invention that use an information processing device for games to realize the present invention will be explained. However, the embodiments described below are provided to give explanations, but not to limit the scope of the present invention. Therefore, those skilled in the art can adopt embodiments in which some or all of the structural elements are replaced with respective equivalents, and it should be understood that such embodiments are also included within the scope of the present invention.

FIG. 1 is an exemplary diagram showing a general configuration of a typical information processing device that functions as a game device of the present invention by running a program. The explanation will be given with reference to this diagram.

The information processing device 100 includes a CPU (Central Processing Unit) 101, a ROM (Read Only Memory) 102, a RAM (Random Access Memory) 103, an interface 104, a controller 105, an external memory 106, a DVD-ROM (Digital Versatile Disc-Read Only Memory) drive 107, an image processor 108, a sound processor 109, and an NIC (Network Interface Card) 110.

As a DVD-ROM that stores a game program and data is loaded in the DVD-ROM drive 107 and the information processing device 100 is powered on, the program is run and a game device of the present embodiment is thus realized.

The CPU 101 controls the entire operation of the information processing device 100, and is connected to each structural element to exchange control signals and data therewith. The CPU 101 can perform arithmetic operations, such as addition, subtraction, multiplication, and division, logical operations, such as logical addition, logical multiplication, and logical negation, and bit operations, such as bitwise OR, bitwise AND, bit inversion, bit shift, and bit rotation, using an ALU (Arithmetic Logic Unit) (not illustrated) to a register (not illustrated) which is an memory area that can be accessed at a high speed. Furthermore, the CPU 101 may by itself be configured to perform saturate calculations, such as addition, subtraction, multiplication, and division, vector operations like trigonometric functions, to cope with multimedia processing, or may realize these operations with a coprocessor.

An IPL (Initial Program Loader), which is executed immediately after the power is turned on, is recorded in the ROM 102, and as executed, causes a program stored in a DVD-ROM to be read into the RAM 103 and the read program is executed by the CPU 101. Furthermore, an operating system program and various data necessary for controlling the operation of the whole information processing device 100 are stored in the ROM 102.

The RAM 103 is a temporary memory for storing data and programs, and retains programs and data read out from the DVD-ROM and data necessary for game proceeding and chat communications. The CPU 101 has a variable area in the RAM 103, and performs such processes as performing operations by directly working the ALU on the value stored as the variable, or once storing the value stored in the RAM 103 in the register to perform calculations on the register and writing back the calculation result in the memory.

The controller 105 connected via the interface 104 receives an operation input given by a user for playing a game, such as a soccer game or a card game.

The external memory 106 detachably connected via the interface 104 rewritably stores data representing a play status of a match-up game or the like (e.g., past achievements), data representing a progress status of a game, log (record) data of chat communication in the case of a network match-up game. As needed, a user can record such data in the external memory 106 by giving an instruction input via the controller 105.

The DVD-ROM to be loaded in the DVD-ROM drive 107 records a program for realizing a game and image data and sound data that accompany the game. Under the control of the CPU 101, the DVD-ROM drive 107 performs a read-out process on the DVD-ROM loaded therein to read out a necessary program and data, which are to be temporarily stored on the RAM 103 or the like.

The image processor 108 processes data read out from the DVD-ROM by means of the CPU 101 and an image computation processor (not illustrated) possessed by the image processor 108, and records the processed data in a frame memory (not illustrated) possessed by the image processor 108. Image information recorded in the frame memory is converted into video signals at predetermined synchronization timings and output to a monitor (not illustrated) connected to the image processor 108. This enables various types of image display.

The image computation processor can perform high speed overlay calculations of two-dimensional images, transparency calculation like a blending, and various saturation calculations.

The image computation processor can also perform high speed rendering of polygon information arranged in a virtual three-dimensional space and affixed with various texture information by Z buffering to obtain a rendered image of the polygon arranged in the virtual three-dimensional space as viewed panoramically from a predetermined view position toward a predetermined direction of visual line.

Furthermore, the CPU 101 and the image computation processor can work together to depict a string of letters as a two-dimensional image in the frame memory or on a surface of a polygon in accordance with font information that defines the shapes of the letters.

Information on an image of a match-up game or an image of a card of a card game is prepared in the DVD-ROM, and such image is expanded in the frame memory, thereby enabling displaying of the way the match-up progresses and a player's card on a screen.

The sound processor 109 converts sound data read out from the DVD-ROM into an analog sound signal and outputs it from a speaker (not illustrated) connected thereto. Further, under the control of the CPU 101, the sound processor 109 generates a sound effect or music data that are to be output in the progress of a game, and outputs sounds corresponding to such data from the speaker.

When sound data recorded in the DVD-ROM is MIDI data, the sound processor 109 refers to sound source data held by the MIDI data to convert the MIDI data into PCM data. When sound data recorded in the DVD-ROM is compressed sound data in an ADPCM form, an Ogg Vorbis form, or the like, the sound processor 109 extracts the data and converts it into PCM data. The sound processor 109 performs D/A (Digital/Analog) conversion on the PCM data at timings corresponding to the sampling frequency of that data and outputs it to the speaker, thereby enabling sound output.

The NIC 110 connects the information processing device 100 to a computer communication network (not illustrated) like the Internet. The NIC 110 is configured by a 10BASE-T/100BASE-T compatible product used for establishing a LAN (Local Area Network), an analog modem, an ISDN (Integrated Services Digital Network) modem, or an ADSL (Asymmetric Digital Subscriber Line) modem for connecting to the Internet via a telephone line, a cable modem for connecting to the Internet via a cable television line, or the like, and an interface (not illustrated) that intermediates between any of those and the CPU 101.

Furthermore, the information processing device 100 may use a large capacity external storage device like a hard disk drive and configure it to serve the same function as the ROM 102, the RAM 103, the external memory 106, the DVD-ROM loaded in the DVD-ROM drive 108, or the like.

Next, an explanation will be given of a process executed by a game device 200 of the present embodiment. The game device 200 executes a fighting game of a player character object (hereinafter, simply called a "player character") which moves in a virtual space in response to an instruction from a player with an enemy character object (hereinafter, simply called an "enemy character"). A motion instruction for the enemy character is given by the game device 200. The player character and the enemy character are movable within the virtual space. However, the content of the game is just an example.

Figure 2:
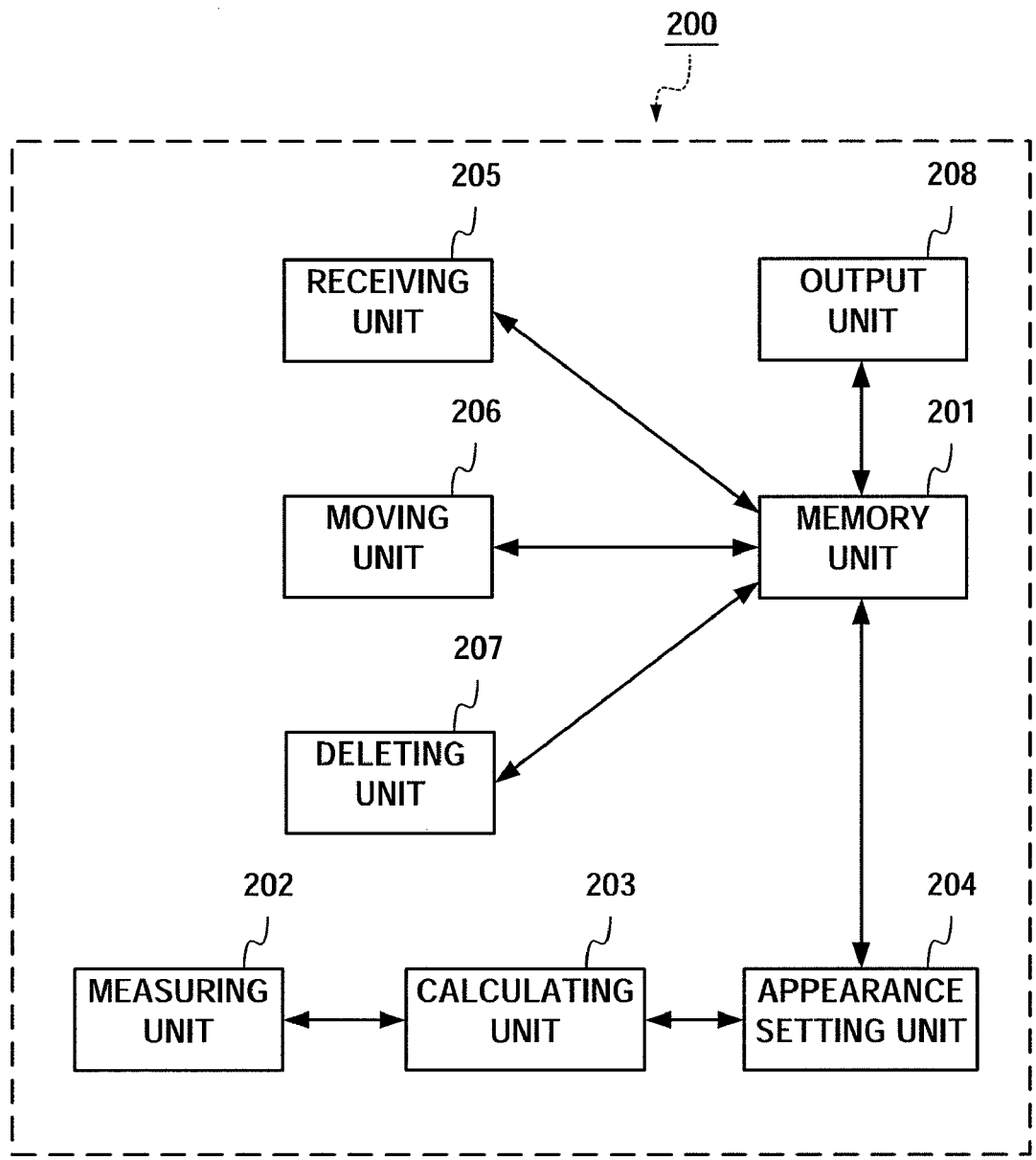
FIG. 2 is a diagram for explaining a process executed by each unit of the game device.

FIG. 2 shows a configuration of the game device 200. The game device 200 includes a memory unit 201, a measuring unit 202, a calculating unit 203, an appearance setting unit 204, a receiving unit 205, a moving unit 206, a deleting unit 207, and an output unit 208.

The memory unit 201 stores (1) a position of the player character in the virtual space, (2) a position of an enemy character, and (3) a candidate of a position when an enemy character is caused to appear. Respective positions are expressed as spatial coordinate values using, for example, a coordinate system set in the virtual space. How to set a coordinate system is arbitrary. For example, a Cartesian coordinate system with three axes intersecting at right angles one another can be used. Moreover, a polar coordinate system like a spherical coordinate using one moving radius and two variation angles can also be used. The memory unit 201 stores those pieces of information in a predetermined memory area in the RAM 103. Those pieces of information may be stored in the external memory 106.

The player operates the controller 105 to give an instruction to the player character and to move it or to fight against an enemy character. For example, when an attack from a player character toward an enemy character brings the damage level (i.e., a so-called "damage") of the enemy character or the total damage equal to or greater than a predetermined value, the enemy character is defeated and thus the player character wins. The enemy character may disappear (cleared off in the virtual space) regardless of an attack by the player character, if a predetermined time after the enemy character has appeared elapses.

The game device 200 causes an enemy character to appear in accordance with the development of the game. For example, when an enemy character is defeated or disappears, the game device 200 causes a new enemy character to appear in the virtual space. The position where the new enemy character appears is selected by the appearance setting unit 204 to be discussed later from candidate positions stored in the memory unit 201. A selecting scheme will be discussed later.

In the following explanation, a description "the player character defeats an enemy character" means "the player character wins against the enemy character" or "the predetermined attribution parameter of the enemy character becomes equal to or less than a predetermined value by fighting before the attribution parameter of the player character".

FIG. 3A shows an example configuration of data indicating a position of the player character stored in the memory unit 201. FIG. 3B shows an example configuration of data indicating a position of an enemy character. Positions of enemy characters are stored by what corresponds to the number of enemy characters present in the virtual space. Identification information is information for identifying a kind of an enemy character or an individual. Identification information is expressed by, for example, a number, a letter, a symbol, and the like.

In the present embodiment, the number of the players and the number of the player characters in this fighting game are one, respectively, but a plurality of players may participate in the game or a plurality of player characters may be present in the game. In this case, it is appropriate that the memory unit 201 stores, as information indicating a position of a player character, identification information for identifying each player character and a position thereof in association with each other.

In the following explanation, a combination of identification information of an enemy character and a position of the enemy character will be called a "record".

FIG. 3C shows an example configuration of data indicating a candidate of a position when an enemy character is caused to appear and stored in the memory unit 201. Like FIG. 3B, identification information is information for identifying a kind of an enemy character and an individual. A candidate list is a list of candidate positions where a new enemy character may appear. The candidate list is not limited to one candidate, but may contain multiple candidates. Those candidates are set beforehand. For example, in FIG. 3C, coordinate values (X1, Y1, Z1) and coordinate values (X2, Y2, Z2) and the like are set as a first candidate, a second candidate, and the like, respectively, of a position where an enemy character may newly appears for an enemy character identified by identification information "0001".

When there are N number (N is an integer equal to greater than 1) of candidates, the appearance setting unit 204 selects any one candidate among those N number of candidates, and updates a position of an enemy character stored in the memory unit 201 so as to arrange the enemy character at that position. Each candidate position may be specified based on which region such a position belongs among plural regions set beforehand, such as "region one", "region two", instead of using coordinate values. In this case, any position in the selected region becomes a position where an enemy character newly appears.

Note that FIGS. 3A to 3C are just examples. Embodiments which include some of those pieces of information may be adopted, and embodiments which store another information in addition to those pieces of information may be adopted.

The CPU 101 and the RAM 103 work together to function as the memory unit 201.

The measuring unit 202 measures an elapsed time after the fighting game is started up to a present time, and stores a measured elapsed time in the predetermined memory area in the RAM 103. The measuring unit 202 measures an elapsed time using an internal clock (not shown) of the game device 200. The measuring unit 202 may measure a precise time on an hour, a minute, and a second basis to acquire an elapsed time, or may count the number of periodical interruption processes like vertical synchronization interruption (in general 1/60 second) of a monitor, and may take the counted number as an elapsed time. The measuring unit 202 can measure an elapsed time from an arbitrary timing of the fighting game up to a present time.

The CPU 101 works and functions as the measuring unit 202.

In the present embodiment, although the measuring unit 202 acquires an elapsed time after the fighting game is started, an elapsed time from an arbitrary timing in the game may be acquired instead. For example, when the game includes plural stages and scenes depending on the advancement of a scenario, an elapsed time after each stage or scene is started may be used. The measuring unit 202 resets an elapsed time for each stage and scene, and starts over time measuring. When a predetermined event happens in the game, an elapsed time from that event up to a present time may be calculated.

The calculating unit 203 calculates a distance (hereinafter, a "reference distance") which extends as an elapsed time measured by the measuring unit 202 increases. The reference distance is used for setting a position where the appearance setting unit 204, to be discussed later, produces a new enemy character. The unit to be used is arbitrary. Typically, the reference distance is expressed as a distance between two points using a unit length defined in a coordinate system set in the virtual space in which the fighting game is executed (a distance between positional coordinates of the player character and positional coordinates of an enemy character).

Figure 4:
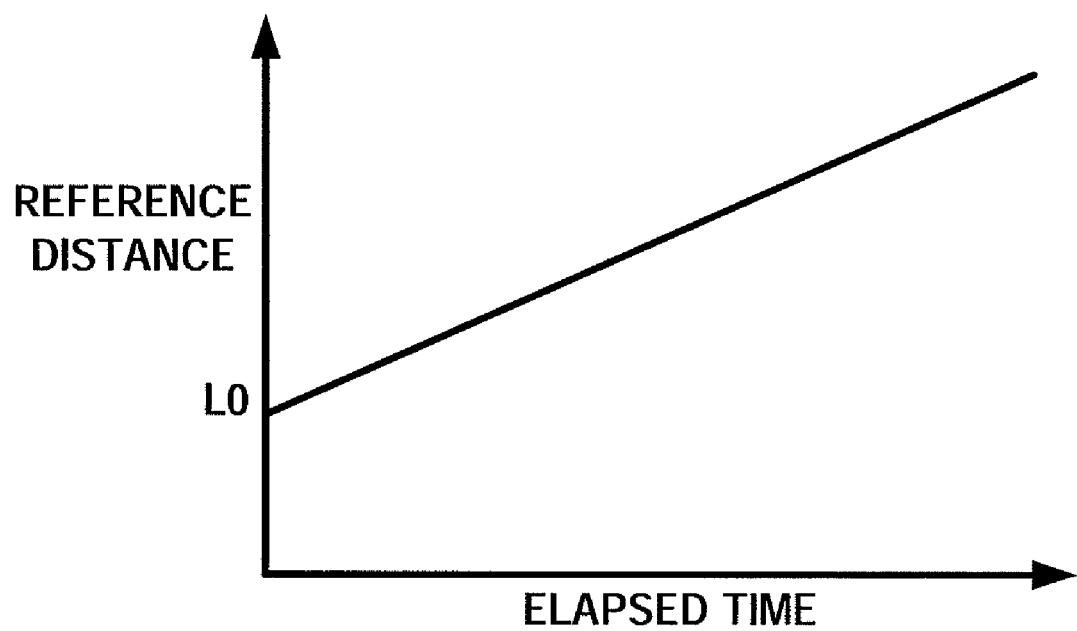
FIG. 4 is a diagram showing an example relation between an elapsed time of a game and a reference distance for acquiring a position where a new enemy character appears.

The longer the elapsed time after the fighting game is started becomes, the longer the reference distance becomes. That is, as shown in, for example, FIG. 4, the reference distance monotonically increases relative to an elapsed time of the game. In FIG. 4, such relation is expressed as a straight-line function, but is not limited to such a function, and may be an arbitrary curvature function. Moreover, the reference distance may be expressed by a non-continuous function like a step function.

Alternatively, the reference distance may be expressed by a table storing reference distances in accordance with plural elapsed times. In this case, the calculating unit 203 performs spline interpolation between individual points to obtain a unique reference distance to an arbitrary elapsed time. How to interpolate is optional.

The CPU 101 works and functions as the calculating unit 203.

The appearance setting unit 204 stores, as a position of a new enemy character, a candidate position having a distance between the candidate position and a position of the player character stored in the memory unit 201 that is closest to the reference distance calculated by the calculating unit 203 in the memory unit 201 among all candidate positions, when a new enemy character appears and which are stored in the memory unit 201.

The CPU 101 and the RAM 103 work together to function as the appearance setting unit 204.

Figure 5:
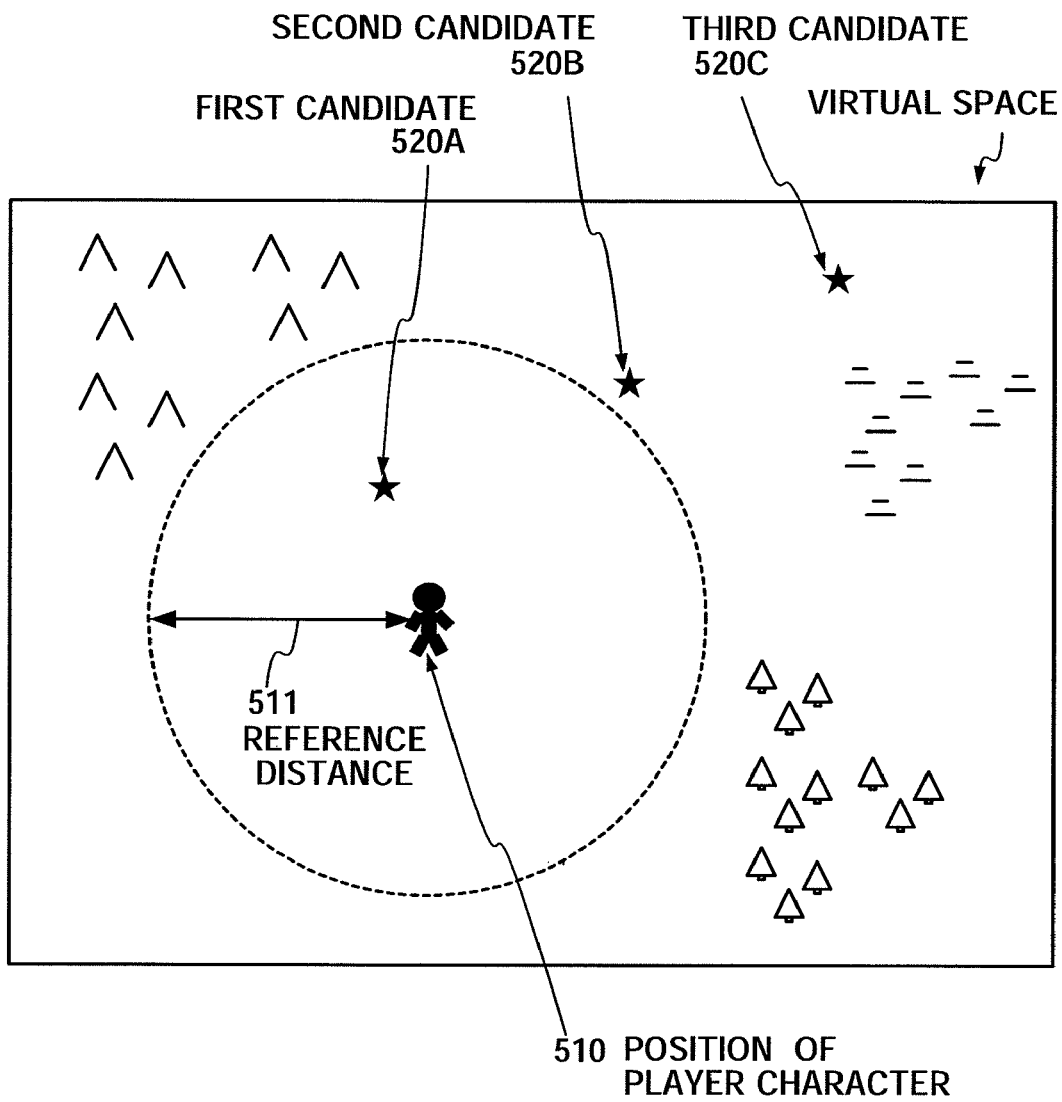
FIG. 5 is a diagram showing an example relation between a reference distance and a candidate of a position where a new enemy character appears.

FIG. 5 is a diagram showing an illustrative relationship between the reference distance and a candidate position where an enemy character newly appears. Respective stars in FIG. 5 indicate candidate positions where an enemy character may newly appear, and in this example, three candidates are shown. That is, the memory unit 201 stores a candidate list including three positions from a first candidate to a third candidate as candidate positions where an enemy character may newly appear.

First, the measuring unit 202 measures an elapsed time up to a present time after the fighting game is started, and the calculating unit 203 acquires a reference distance corresponding to the measured elapsed time. A circle indicated by dashed lines shown in FIG. 5 is a circle having a radius which is the acquired reference distance. The appearance setting unit 204 selects a candidate closest to the reference distance, i.e., a candidate closest to the arc of the circle among the first to third candidates, and sets the selected candidate as a position where a new enemy character appears. In this example, the appearance setting unit 204 selects the second candidate as a position of a new enemy character.

In FIG. 5, the virtual space is expressed in a two-dimensional scale in order to facilitate understanding for the present invention, but may be a three-dimensional space. In the case of the three-dimensional scale, a sphere can be used instead of the circle. FIG. 5 shows a candidate position by a star, and a circle indicating the reference distance by dashed lines, but those are drawn just for the purpose of explanation, and are not displayed on an actual game screen. FIG. 5 is just an example of a screen layout, a candidate position, and the number of candidates can be changed arbitrarily.

The receiving unit 205 acquires a position of the player character, and stores it in the memory unit 201. For example, the receiving unit 205 receives an instruction input given by the user through the controller 105 to acquire a position of the player character, and stores the acquired position of the player character in the memory unit 201. The player can give an instruction of moving the player character in an arbitrary direction using the controller 105. However, if there is a fixed object (e.g., a rock, a tree, a building) in the instructed direction, the player cannot move the player character as instructed.

The CPU 101, the RAM 103, and the controller 105 work together to function as the appearance setting unit 204.

The moving unit 206 moves the position of an enemy character. That is, the moving unit 206 updates the position of an enemy character stored in the memory unit 201. The moving unit 206 updates the position of an enemy character changing in accordance with the game development of the fighting game at a periodical timing like a timing of vertical synchronization interruption of the monitor.

The CPU 101 and the RAM 103 work together to function as the moving unit 206.

The deleting unit 207 deletes a record of an enemy character from the memory unit 201 when the player character defeats that enemy character or that enemy character disappears from the game. Accordingly, the defeated enemy character is deleted from the fighting game.

When the player character defeats an enemy character, the deleting unit 207 may store a flag indicating that the enemy character is defeated in association with the position of the enemy character stored in the memory unit 201. In this case, when producing an enemy character, the appearance setting unit 204 stores a flag indicating that an enemy character is alive (the player character does not yet defeat it) in association with the position of the enemy character. The output unit 208 refers to this flag, determines whether to cause the enemy character to appear in the game screen, and causes the enemy character to appear (or not output it). Alternatively, the output unit 208 determines whether either one of an image expressing that the enemy character is alive and an image expressing that the enemy character is dead is displayed, and outputs an image of the enemy character.

The CPU 101 and the RAM 103 work together to function as the deleting unit 207.

The output unit 208 reads out a position of the player character and a position of an enemy character both stored in the memory unit 201, and outputs the image of the player character and that of the enemy character at respective positions.

When the position of the player character and the position of an enemy character are set in the memory unit 201, the CPU 101 reads out image data of the player character from the DVD-ROM loaded in the DVD-ROM drive 107. The CPU 101 controls the image processor 108 to output the image of the player character at the position of the player character stored in the memory unit 201. Likewise, the CPU 101 reads out image data of the enemy character from the DVD-ROM loaded in the DVD-ROM drive 107. The CPU 101 controls the image processor 108 to output the image of the enemy character at the position of the enemy character stored in the memory unit 201.

The CPU 101 also reads out image data of other character objects in the game, text data and the like from the DVD-ROM. The CPU 101 produces a game screen in accordance with a predetermined game program stored in the DVD-ROM, and outputs the produced game screen on the monitor connected to the image processor 108. The user can play the game by operating the controller 105 while viewing the screen. Image data of the player character and that of an enemy character are typically data having a surface divided into tiny polygons (typically, a triangle and a rectangle) and expressed as numerical data, but may be data in other formats like bitmap data, and is not limited to any particular type of image data according to the present invention.

The CPU 101, the RAM 103, and the image processor 108 work together to function as the output unit 208.

(Appearance Setting Process)

Figure 6:
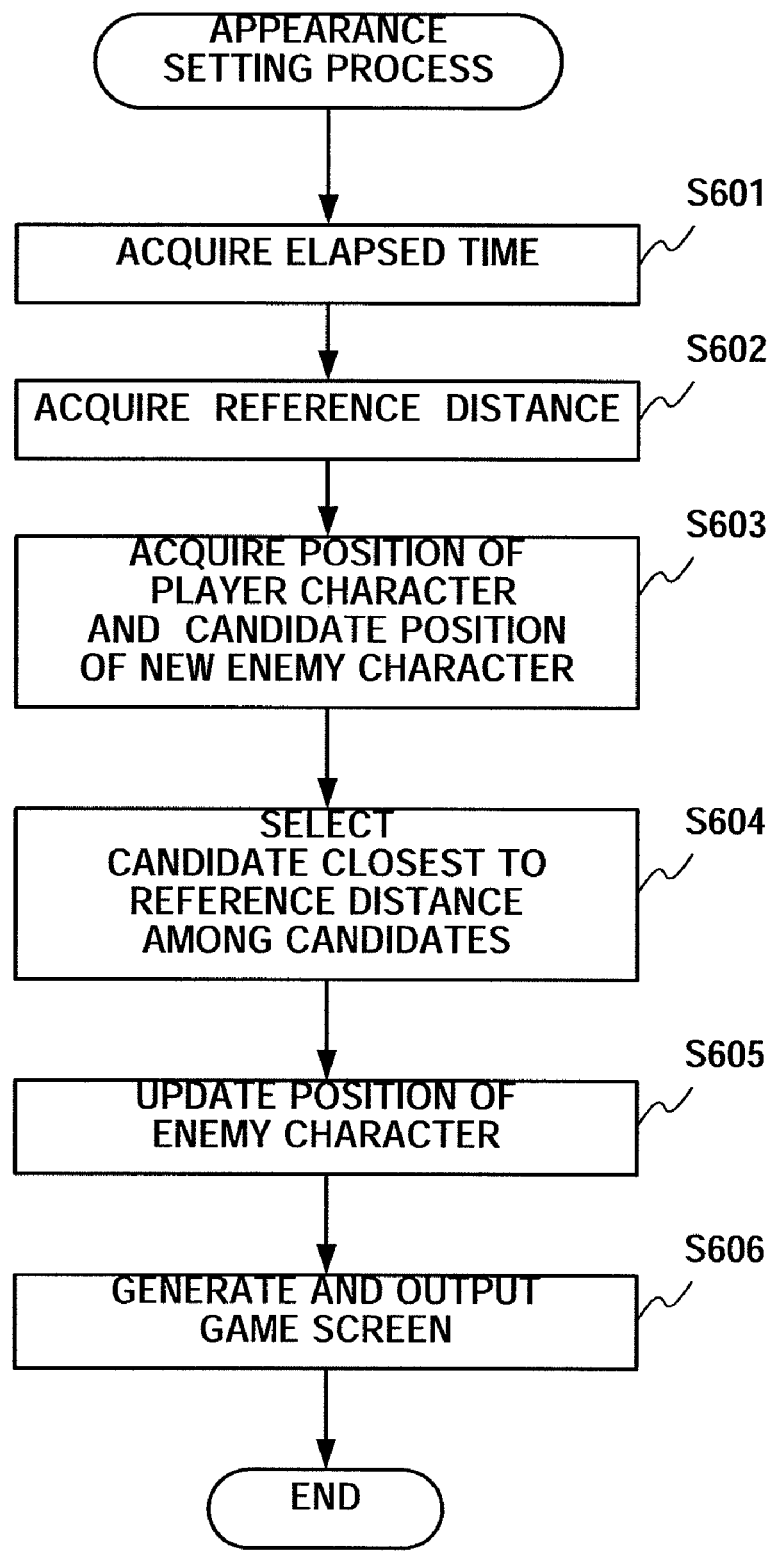
FIG. 6 is a flowchart for explaining an appearance setting process executed by the game device.

Next, an explanation will be given of an appearance setting process executed by individual units of the game device 200 of the present embodiment with reference to the flowchart of FIG. 6. This appearance setting process is executed when the game device 200 causes a new enemy character to appear. In the fighting game, this process is executed at a timing that the game device determines so as to cause a new enemy character to appear after the player character operated by the player using the controller 105 damages another enemy character and defeats it. This is just an example, and the game device 200 can execute the appearance setting process at an arbitrary timing.

The receiving unit 205 receives an instruction input of moving the player character in a designated direction, an instruction input of causing the player character to take a certain action (e.g., an instruction input of causing the player character to wear a sword or a shield), and other instruction input relating to the game from the controller 105 operated by the user. The receiving unit 205 stores data indicating a position of the player character in the memory unit 201 in accordance with those instruction inputs. The receiving unit 205 executes this process at a predetermined periodical timing like the vertical synchronization interruption of the monitor. As a result, the latest position of the player character is stored in the memory unit 201.

The moving unit 206 executes a process of updating a position of an enemy character changing in accordance with the game development at a predetermined periodical timing like the vertical synchronization interruption of the monitor. As a result, the latest position of an enemy character is stored in the memory unit 201.

First, the measuring unit 202 acquires an elapsed time after the fighting game is started (step S601). For example, the measuring unit 202 stores a time when the fighting game is started and a present time in the predetermined memory area of the RAM 103, and acquires an elapsed time from the difference therebetween.

The calculating unit 203 acquires the above-explained reference distance used for setting a position where a new enemy character appears from the elapsed time acquired in the step S601 (step S602). For example, using a function shown in FIG. 4 expressing a relation between the elapsed time and the reference distance, the calculating unit 203 acquires the reference distance.

The appearance setting unit 204 acquires a current position of the player character and a candidate position where a new enemy character appears from the memory unit 201 (step S603). When there are plural candidate positions, the appearance setting unit 204 acquires all of those.

Moreover, the appearance setting unit 204 selects a candidate closest to the reference distance acquired in the step S602 among candidates acquired in the step S603 (step S604). The candidate position selected in this step becomes a position where a new enemy character appears.

The appearance setting unit 204 updates the memory unit 201 in such a way that the candidate position selected in the step S604 becomes an output position of a new enemy character (step S605). More specifically, the appearance setting unit 204 adds a new record indicating a combination of identification information of an enemy character newly appearing and a position where that enemy character newly appears to data shown in, for example, FIG. 3B.

The output unit 208 acquires the position of the player character and the position of the enemy character both stored in the memory unit 201, and generates and outputs a game screen in which respective characters are arranged (step S606).

In the present embodiment, the appearance setting unit 204 selects a candidate closest to the reference distance among the candidates stored in the memory unit 201 and sets the selected candidate as a position where an enemy character newly appears, but may select one among candidates located farthest from the reference distance. For example, when there are multiple candidates located at a distance from the reference distance, the appearance setting unit 204 may select a candidate at random among candidates at a distance that is at least equal to or greater than the reference distance. The appearance setting unit 204 may set a weight on each candidate in such a way that the probability of being selected is small, when a difference from the reference distance becomes large, and one is being selected at random.

For example, a beginner player needs a longer time to defeat an enemy character than an expert player. If a position where an enemy character appears is set completely at random or is fixed, there is a possibility that a new enemy character appears up close to the player character right after the player character defeats an enemy character. This causes the beginner player to feel that the game is too difficult, and results in feeling that the game is unfair, resulting in taking the beginner player's interest out of the game in some cases. However, according to the present invention, a position where an enemy character newly appears is set to a position farther and farther from the player character as the time it takes the player character to defeat an enemy character is longer and longer. This makes it possible to prevent the beginner player from feeling that the game is unreasonably difficult.

For example, an expert player often defeats an enemy character in a time shorter than a beginner player. If a new enemy character frequently appears a position apart from the player character after the player character defeats an enemy character, the expert player may feel that the game is too easy and get bored with the game, resulting in loosing of the player's interest to the game in some cases. According to the present invention, however, because a position where an enemy character newly appears is set to a position closer and closer to the player character as the time it takes the player character to defeat an enemy character is shorter and shorter. This makes it possible to prevent the expert player from becoming dissatisfied with the game.

According to the present embodiment, the game device 200 causes a next new enemy character to appear near the player character right after the beginning of a game when the player character defeats an enemy character, and causes a next new enemy character to appear at a position apart from the player character when the player character defeats an enemy character after a period of time has elapsed from game start. Accordingly, it is possible to suppress any sequential appearance of enemy characters up close to the player character which makes the difficulty level of the game unreasoningly increased.

An enemy character which has an appearance position controlled through the foregoing appearance setting process and an enemy character which is not so controlled may be mixed and present in the game.

According to the present embodiment, when producing a new enemy character, the game device 200 changes a position where the enemy character appears in accordance with an elapsed time of the game, thereby preventing the game from becoming too difficult or too easy. Causing an enemy character to appear without largely deteriorating a game balance makes the game more amusing for all players including a beginner player and an expert player, etc.

Second Embodiment

Figure 7:
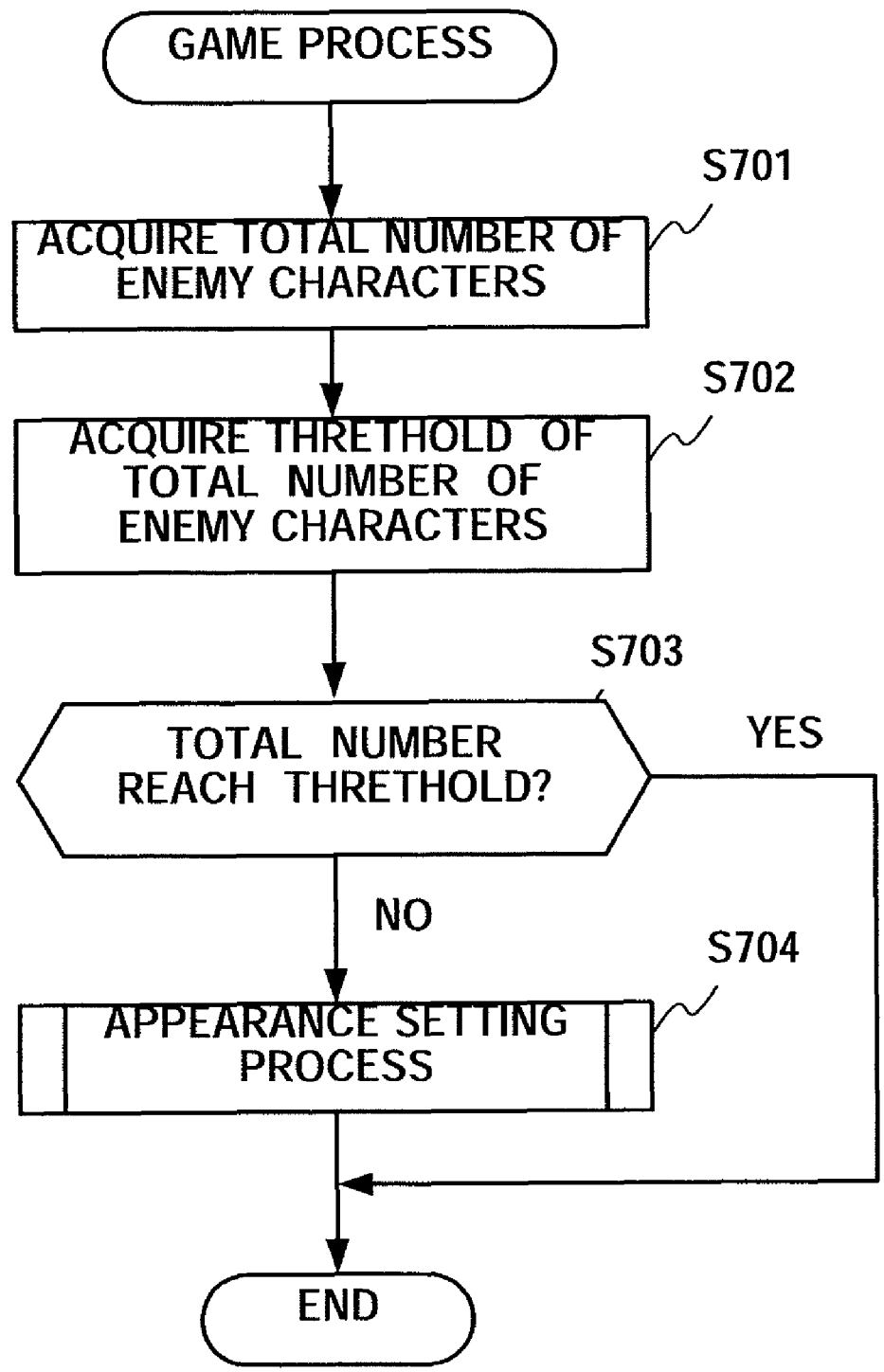
FIG. 7 is a flowchart for explaining a process executed by the game device in a second embodiment.

Next, an explanation will be given of another embodiment of the present invention with reference to the flowchart of FIG. 7. The present embodiment differs from the foregoing embodiment in that the total number of enemy characters appearing in the fighting game is so controlled as not to exceed a predetermined number. The same structural element as that of the foregoing embodiment will be denoted by the same reference numeral, and the duplicated explanation thereof will be skipped.

The memory unit 201 further stores a threshold (upper limit) of the total number of enemy characters which can appear simultaneously in the game. The threshold is stored in the game program in the DVD-ROM beforehand, and is read out by the CPU 101 when the game starts, and is stored in the memory unit 201. For example, the threshold may be set for each stage, and for each scene of the game. An upper limit common through the whole game may be set instead.

First, the appearance setting unit 204 acquires a total number of enemy characters already present in the game (step S701). The appearance setting unit 204 counts the record number of data each indicating a position of an enemy character and stored in the memory unit 201, thereby acquiring the total number.

The appearance setting unit 204 acquires the threshold of the total number of enemy characters that may appear in the game from the memory unit 201 (step S702).

The appearance setting unit 204 determines whether the total number of enemy characters acquired in the step S701 reaches the threshold acquired in the step S702 (step S703).

When it is determined that the total number did not reach the threshold (step S703: NO), the game device 200 executes the foregoing appearance setting process shown in FIG. 6 (step S704). Conversely, when it is determined that the total number reaches the threshold (step S703: YES), the game device 200 terminates the process. Note that the process executed in the step S704 is same as the above-explained process, so that the duplicated explanation thereof will be skipped.

The deleting unit 207 can delete data indicating a position of an enemy character from the memory unit 201 when the player character inflicts damage equal to or greater than a predetermined level to the enemy character, or when the predetermined time in which the enemy character is naturally to disappear elapses. Thereafter, the output unit 208 can delete the enemy character from the game screen.

As explained above, according to the present embodiment, the game device 200 controls the total number of enemy characters currently present in the game so as not to exceed the threshold set beforehand. That is, if the total number of enemy characters does not reach the threshold when a new enemy character is caused to appear, the game device 200 changes the position where the enemy character appears in accordance with the elapsed time of the game, and then causes the enemy character to appear, thereby preventing the game from becoming too difficult. Causing an enemy character to appear without largely deteriorating a game balance makes the game more amusing for all players including a beginner player and an expert player, etc.

Third Embodiment

Figure 8:
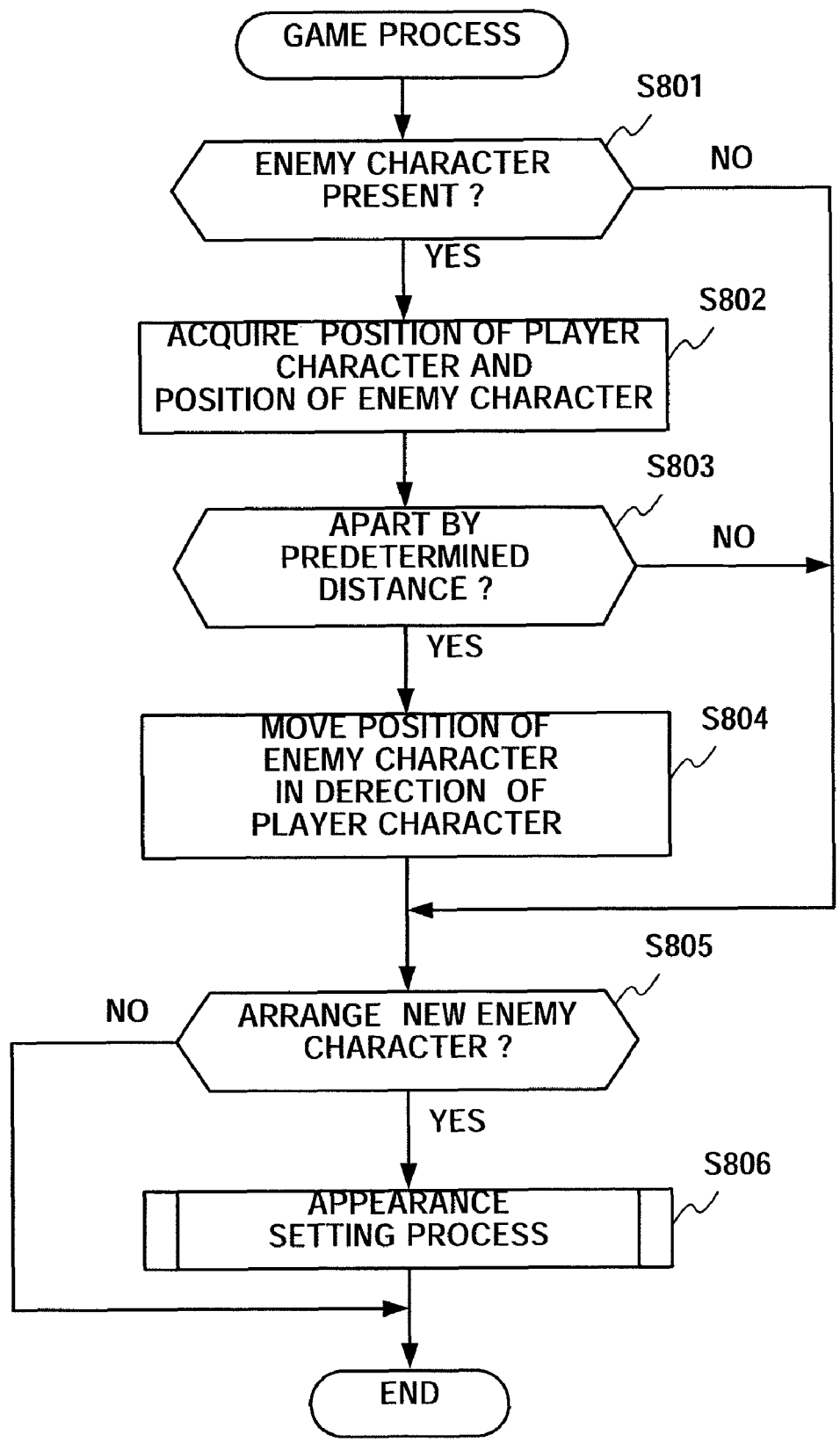
FIG. 8 is a flowchart for explaining a process executed by the game device in a third embodiment.
Figure 9:
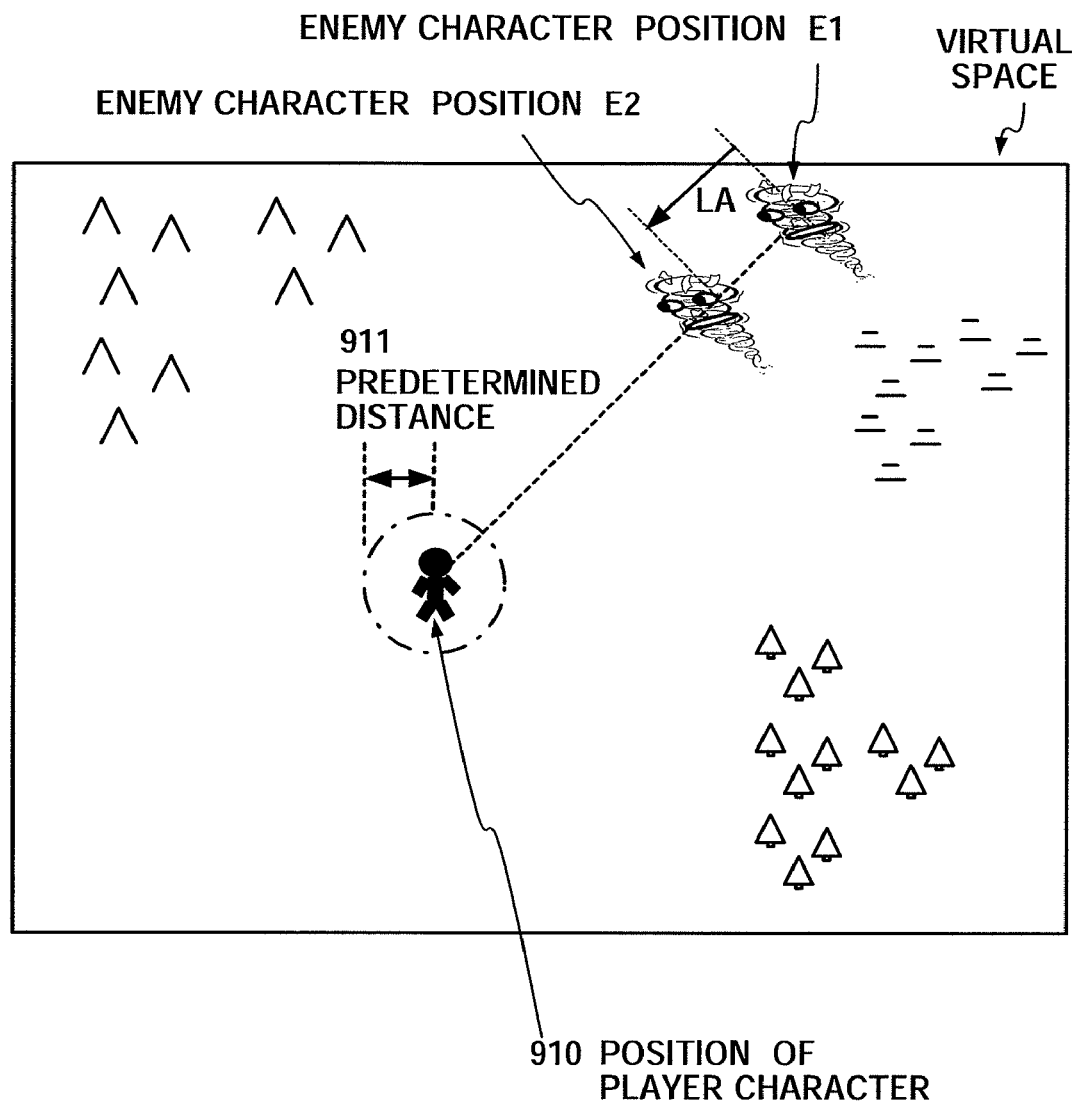
FIG. 9 is a diagram showing an example position where an enemy character is to be moved.

Next, one of the other embodiments of the present invention will be explained with reference to the flowchart of FIG. 8 and FIG. 9. The present embodiment differs from the foregoing embodiments in that an enemy character is so controlled as to move closer to a position where the player character is present in the game. The same structural element will be denoted by the same reference numeral, and the duplicated explanation thereof will be skipped.

First, the moving unit 206 determines whether an enemy character is present in the current fighting game (step S801). The moving unit 206 counts the record number of data each indicating a position of an enemy character and stored in the memory unit 201, determines that an enemy character is present if the record number is equal to or greater than 1, and determines that no enemy character is present if the record number is not equal to or greater than 1.

When it is determined that no enemy character is present (step S801: NO), the appearance setting unit 204 executes a process following a step S805 to be discussed later.

Conversely, when determining that an enemy character is present (step S801: YES), the moving unit 206 acquires the current position of the player character and that of the enemy character (step S802). When there are multiple enemy characters, the moving unit 206 acquires all of those positions.

The moving unit 206 determines whether the player character is apart from the enemy character by equal to or greater than a predetermined distance (step S803). The predetermined distance could be sufficient distance so that the player character and the enemy character do not overlap with each other when the output unit 208 outputs a game image. The predetermined distance is stored in the game program in the DVD-ROM beforehand, is read out by the CPU 101 when the game starts, and is stored in the memory unit 201.

When it is determined that the player character is not apart by equal to or greater than the predetermined distance (step S803: NO), the game device 200 progresses the process to the step S805 to be discussed later. In this case, the moving unit 206 may change the position of the enemy character so that the player character and the enemy character become apart by equal to or greater than the predetermined distance, and may store the changed position in the memory unit 201.

When determining that the player character is apart by equal to or greater than the predetermined distance (step S803: YES), the moving unit 206 moves the position of the enemy character so as to come closer to the position of the player character (step S804), and stores the moved position in the memory unit 201. For example, as shown in FIG. 9, when an enemy character is present at a position E1 at a given time, the moving unit 206 moves the enemy character to a position E2 so as to come closer to the player character by a distance "La" per unit time. The moving unit 206 acquires positional coordinates of the enemy character, and stores the acquired coordinates in the memory unit 201.

The unit time is a time interval using, for example, the number of vertical synchronization interruptions of the monitor. The distance La moved per unit time can be set to different values depending on the kinds of enemy character and the differences in individuals. The distance La corresponds to a moving speed set for each enemy character, and is calculated by the CPU 101 when executing the game program to progress the game. The distance La may be a fixed value, or depending on enemy characters, an enemy character may be set to be unmovable (La=0). When there are multiple enemy characters, the moving unit 206 executes a process of moving positions of all enemy characters based on the positions acquired in the step S802.

Moreover, the appearance setting unit 204 determines whether to arrange a new enemy character in the virtual space (step S805). For example, the appearance setting unit 204 performs determination through the processes from the step S701 to the step S703 in the foregoing embodiment. That is, the appearance setting unit 204 acquires the current total number of enemy characters (step S701), acquires the threshold (upper limit) that allows arrangement of an enemy character (step S702), and determines whether the total number exceeds the threshold (step S703).

When determining to arrange a new enemy character (step S805: YES), the appearance setting unit 204 executes the foregoing appearance setting process (step S806). Conversely, when determining not to arrange a new enemy character (step S805: NO), the game device 200 terminates the process of moving the position of the enemy character. When a new enemy character is arranged in the step S806, the enemy character newly arranged becomes a target for moving the position thereof in the process at next time.

As explained above, according to the present embodiment, the game device 200 moves an enemy character present in the game toward the position where the player character is present, thereby making the game not too easy for the player. Causing an enemy character to appear without largely deteriorating a game balance makes the game more amusing for expert players of the game, etc.

Fourth Embodiment

Next, one of the other embodiments of the present invention will be explained with reference to FIGS. 10 and 11. The present embodiment differs from the foregoing embodiments on how to select a candidate position by taking into consideration the factor that there are multiple candidates apart by the same distance as the reference distance among candidates of new enemy characters. The structural element as those of the foregoing embodiments will be denoted by the same reference numeral, and the duplicated explanation thereof will be skipped.

Figure 10:
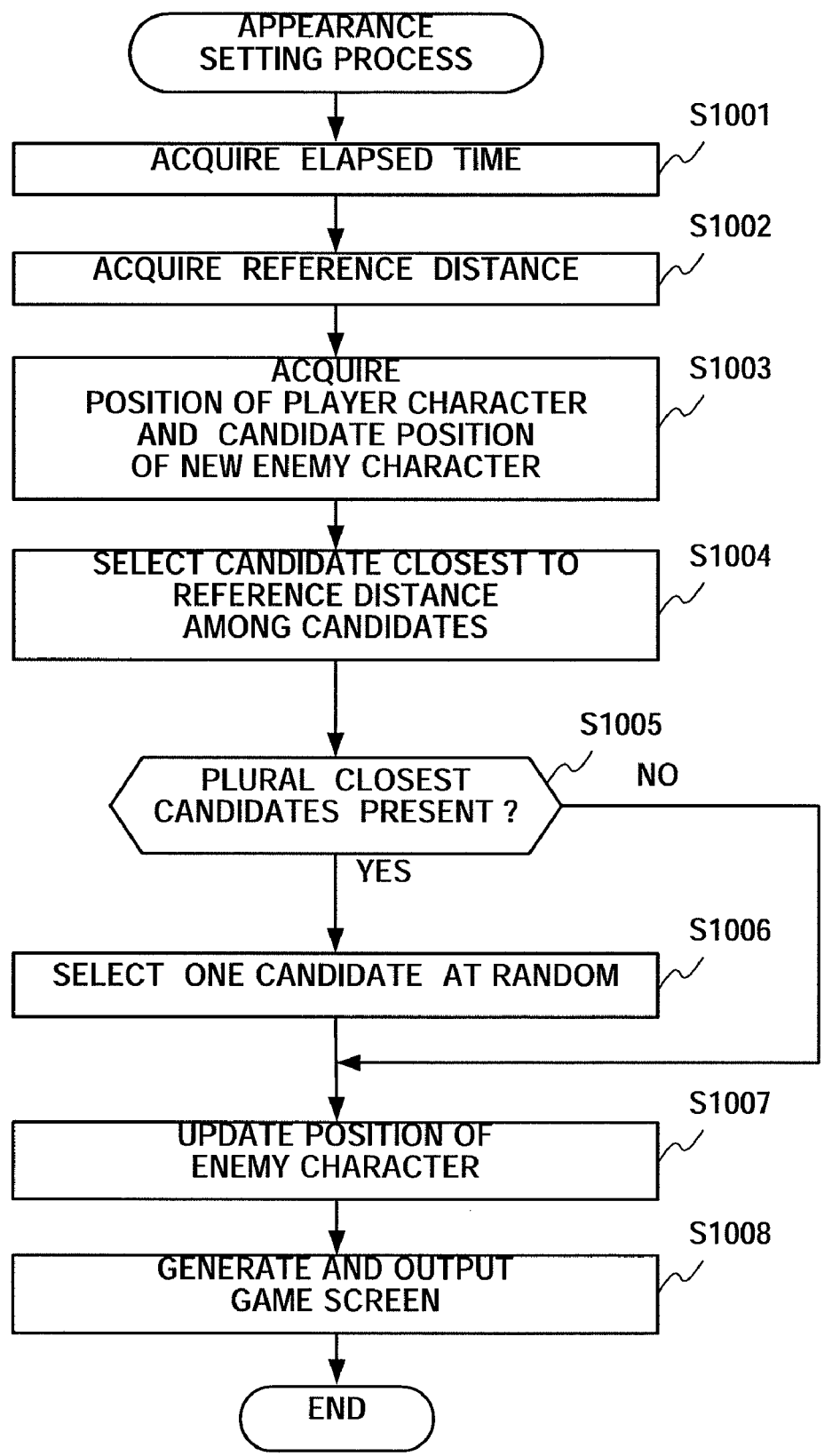
FIG. 10 is a flowchart for explaining the appearance setting process executed by the game device in a fourth embodiment.

FIG. 10 is a flowchart for explaining an appearance setting process executed by the game device 200 of the present embodiment.

Figure 11A:
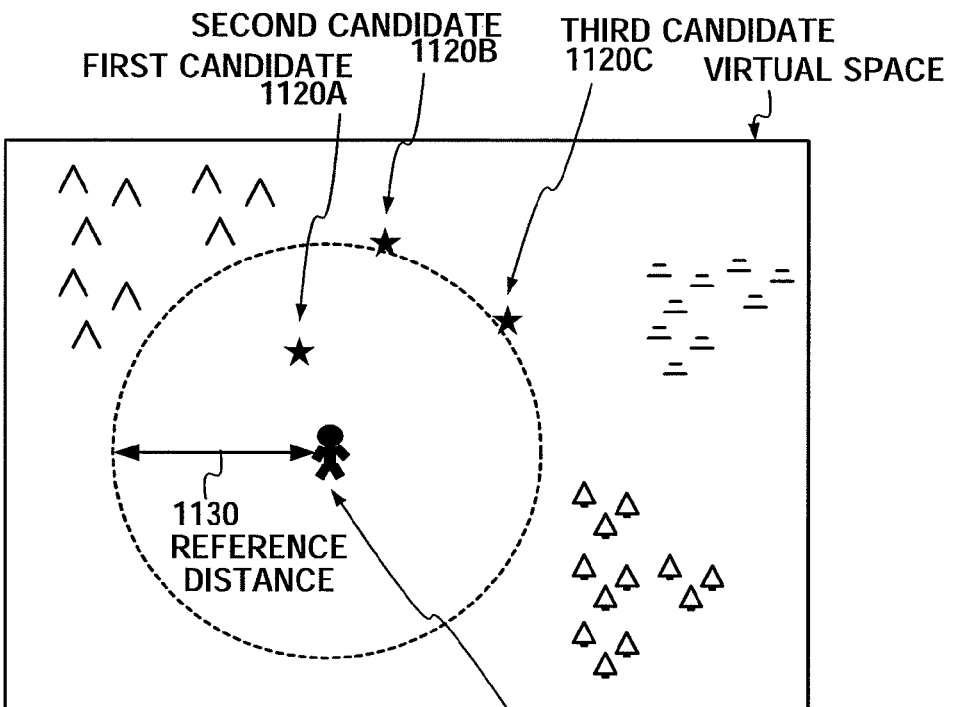
FIG. 11A is a diagram showing an example relation between a reference distance and a candidate of a position where a new enemy character appears.
Figure 11B:
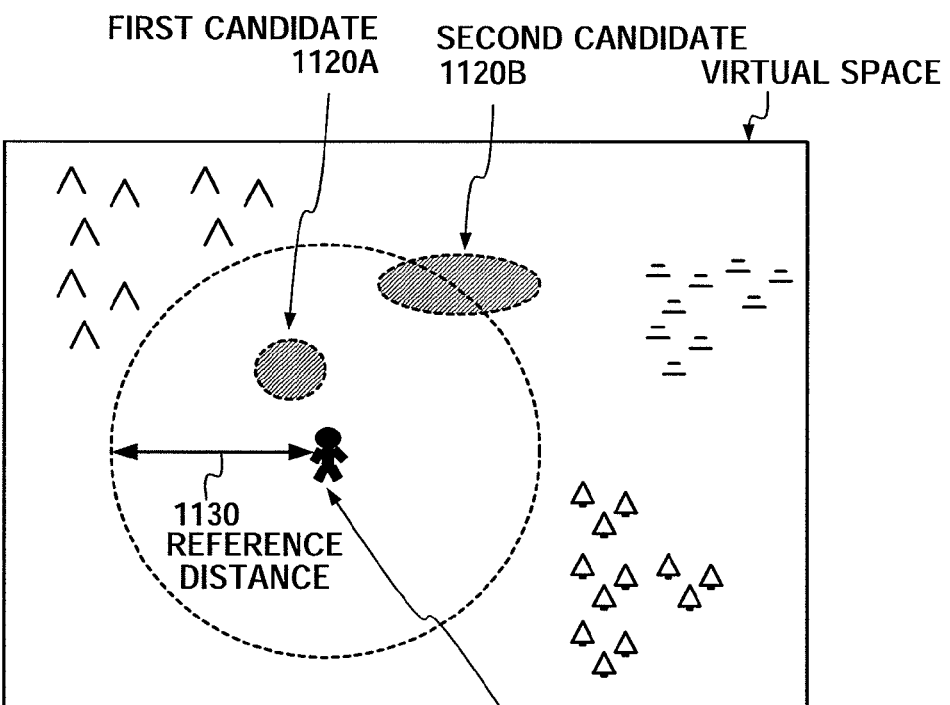
FIG. 11B is a diagram showing an example relation between a reference distance and a candidate of a position where a new enemy character appears.

FIGS. 11A and 11B are diagrams showing a relation between the reference distance and a candidate position where an enemy character newly appears. FIG. 11A shows a candidate position by a star, and a circle indicating the reference distance is drawn by dashed lines. Those are drawn just for the purpose of explanation, and are not displayed on an actual game screen. FIGS. 11A, 11B are just examples.

As explained above, the memory unit 201 stores a candidate position when a new enemy character appears. The multiple candidates can be set. Accordingly, among candidate positions stored when an enemy character is caused to appear and which are stored in the memory unit 201, there may be multiple candidates in some cases having a distance between the position of that candidate and the player character that is closest to the reference distance calculated by the calculating unit 203. For example, in FIG. 11A, two of the second candidate and the third candidate are the closest candidates to the reference distance. The candidate position when an enemy character is caused to appear may be specified as an area instead of coordinates. For example, in FIG. 11B, in the area of the first candidate and the area of the second candidate, there are multiple number of points having the reference distance calculated by the calculating unit 203 in the area of the second candidate. That is, in a circle indicating the reference distance, all points over a circular arc overlapping the second area can be candidates of a position when an enemy character is caused to appear.

In this case, the appearance setting unit 204 selects a candidate at random among the multiple candidates, and stores the position of the selected candidate in the memory unit as a position of a new enemy character. For example, in the case of FIG. 11A, the appearance setting unit 204 selects a candidate in the second candidate and the third candidate at random. In the case of FIG. 11B, for example, the appearance setting unit 204 selects a point among the points on the circular arc overlapping the second area at random.

When there are multiple candidates that have a distance between the position of that candidate and the position of the player character which is closest to the reference distance among the candidates stored in the memory unit 201, the appearance setting unit 204 may set a bias (weight) to increase the probability that those candidates will be selected, and may select a candidate at random. For example, as a candidate set in a forest area is weighted more than a candidate set in a grassland area, the candidate in the forest area is more likely to be selected even if the distance is same.

Moreover, a priority may preliminarily be set for a candidate of a position when a new enemy character appears, and the appearance setting unit 204 may select a candidate in accordance with the priority. The memory unit 201 may store multiple stages of priorities corresponding to candidates of a position when a new enemy character appears. When there are multiple candidates closest to the reference distance, the appearance setting unit 204 may select a candidate having the highest priority among those candidates.

Next, the appearance setting process of the present embodiment will be explained with reference to the flowchart of FIG. 10. The processes from a step S1001 to a step S1004 are same as the foregoing steps S601 to S604, so that the duplicated explanation thereof will be skipped.

In a step S1005, the appearance setting unit 204 determines whether there are multiple candidates closest to the reference distance and selected in step S1004.

When determining that there are multiple candidates (step S1005: YES), the appearance setting unit 204 selects a candidate among those candidates at random (step S1006). The appearance setting unit 204 may select a candidate at random with the weighing of selection probability or the priority being set for each candidate. The appearance setting unit 204 updates the memory unit 201 so that the position of the selected candidate becomes an output position of a new enemy character (step S1007). The output unit 208 acquires a position of the player character and that of the enemy character both stored in the memory unit 201, and generates and outputs a game screen in which those characters are arranged at respective positions (step S1008).

Conversely, when determining that there are no multiple candidates (step S1005: NO), the appearance setting unit 204 updates the memory unit 201 so that the position of the candidate selected in the step S1004 becomes an output position of a new enemy character (step S1007). The output unit 208 generates and outputs a game screen in which the characters are arranged at respective positions (step S1008).

As explained above, according to the present embodiment, when there are multiple candidates apart by the same distance as the reference distance, the game device 200 selects a candidate appropriately to cause an enemy character to appear, thereby preventing the game from becoming too difficult or too easy for the player. Causing an enemy character to appear without largely deteriorating a game balance makes the game more amusing for all players including a beginner player and an expert player, etc.

Fifth Embodiment

Next, one of the other embodiments of the present invention will be explained. The present embodiment is a modified example that changes how to select a candidate among multiple candidates of a position when an enemy character is caused to appear. The same structural element as those of the foregoing embodiment will be denoted by the same reference numeral, and the duplicated explanation thereof will be skipped.

The appearance setting unit 204 selects, among candidates of a position when an enemy character is caused to appear and which are stored in the memory unit 201, a candidate at random within a predetermined allowable range including positions of candidates closest to the reference distance calculated by the calculating unit 203. The appearance setting unit 204 stores the selected position in the memory unit 201 as a position of a new enemy character.

Figure 12:
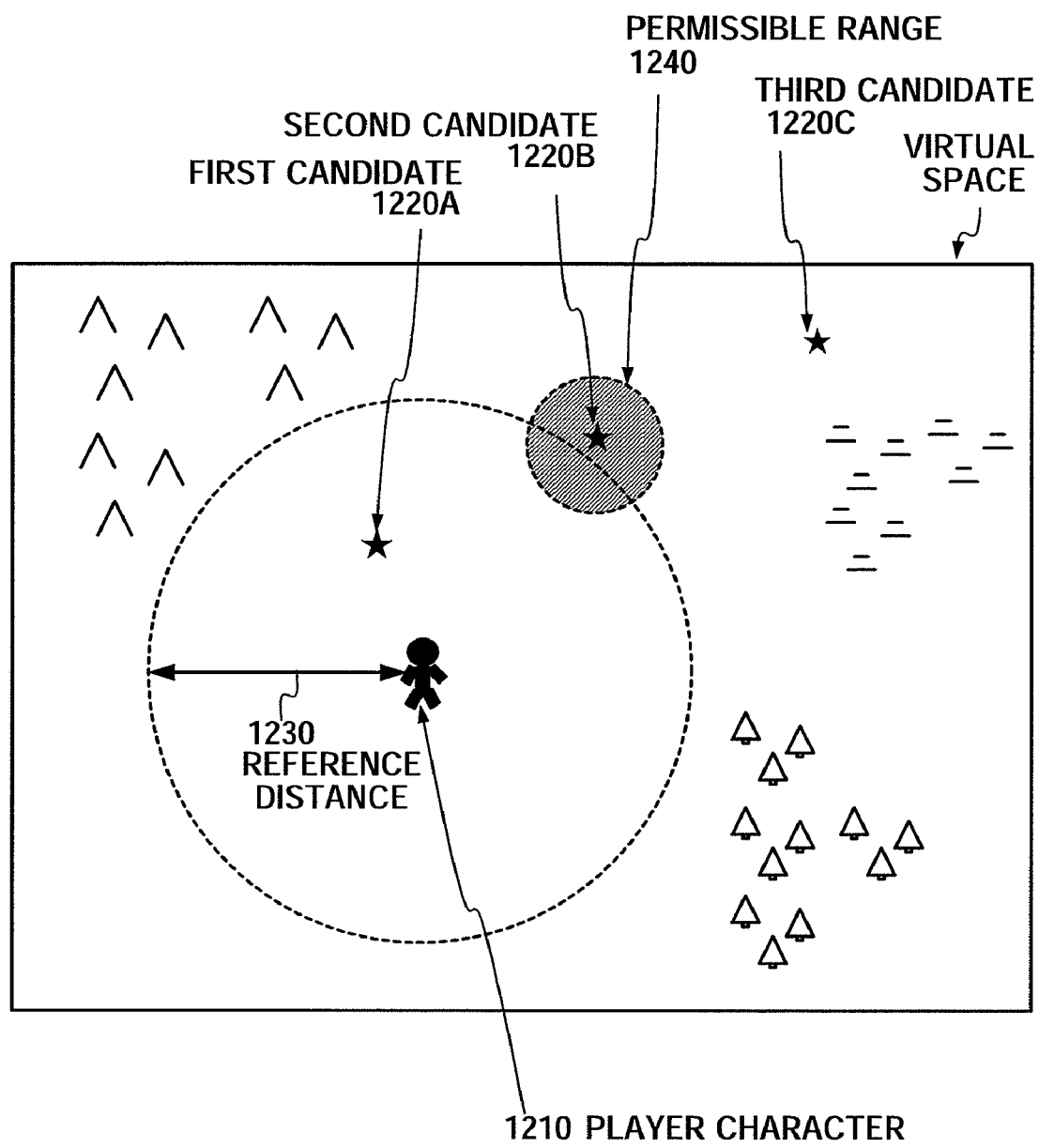
FIG. 12 is a diagram showing an example relation among a reference distance, a candidate of a position where a new enemy character appears, and an allowable range.

FIG. 12 is a diagram showing a relation among the reference distance, a candidate of a position where an enemy character newly appears, and an allowable range. Respective stars in FIG. 12 are positions of candidates of a position where an enemy character newly appears. FIG. 12 shows three candidates.

First, the measuring unit 202 measures an elapsed time up to a present time after the fighting game is started, and the calculating unit 203 acquires a reference distance corresponding to the measured elapsed time. A circle of dashed lines shown in FIG. 12 is a circle having a radius which is the acquired reference distance.

The appearance setting unit 204 selects a candidate closest to the reference distance, i.e., a candidate closest to the arc of this circle among the first to third candidates. In the case of FIG. 12, the second candidate is selected. Further, the appearance setting unit 204 sets a predetermined allowable range including a position of the selected candidate. In the case of FIG. 12, the interior of a circle having a radius with a predetermined length around the center of the position of the second candidate is set as the allowable range.

Thereafter, the appearance setting unit 204 selects a position at random within the set allowable range, and sets the selected position as a position where a new enemy character appears.

In this example, the shape of the allowable range is the interior of a circle having a radius with a predetermined length around the center of the position of the candidate stored in the memory unit 201, but this is just an example, and can be an arbitrary shape. Moreover, in FIG. 12, a position of the candidate are expressed by a star, a circle indicating the reference distance is drawn by dashed lines, and a hatched area indicates the allowable range, but those are drawn just for the purpose of explanation, and not displayed on an actual game screen.

For example, when another character object is already arranged at a candidate position where an enemy character newly appears and which is stored in the memory unit 201, the appearance setting unit 204 sets an allowable range around the candidate position. The appearance setting unit 204 avoids a position where another character object is already arranged, and selects a position within the allowable range set around the candidate position at random.

More specifically, in the step S1005 of the foregoing embodiment, the appearance setting unit 204 determines whether another character object is already arranged at a position of the selected candidate. When another character object is already arranged, the appearance setting unit 204 sets a predetermined allowable range including the position of the selected candidate in the step S1006, and selects a position within the allowable range, and sets the selected position as a position where a new enemy character appears. When another character object is not arranged, the appearance setting unit 204 sets the position of the candidate selected in the step S1004 as a position where a new enemy character appears. The processes in the other steps are same as those of the foregoing embodiment, so that the duplicated explanation thereof will be skipped. In this fashion, character objects do not overlap at the same position.

For example, when a candidate position, which is stored in the memory unit 201, where an enemy character newly appears is configured so as to be specified by a region with a certain width, not by coordinates of a point, the present embodiment is appropriate. That is, the game device 200 can set a position where an enemy character appears without using absolute coordinate values.

Moreover, a priority may preliminarily be set for an area within the allowable range, and the appearance setting unit 204 may select a candidate in accordance with the priority. In this case, the memory unit 201 stores predetermined stages of priorities corresponding to respective positions of the area in the allowable range. A larger probability to be selected is set for a position having a higher priority.

For example, the appearance setting unit 204 sets an interior of a circle with a radius R0 around a candidate position as an allowable range. Moreover, lengths R1 and R2 which satisfy $0<R1<R2<R0$ are also set. The appearance setting unit 204 sets the selection probability of a point in a concentric circle having a radius R1 around the candidate position to P1, sets the selection probability of a part within a concentric circle with a radius R2 and not included in the concentric circle with the radius R1 to P2, and sets the selection probability of a part within a concentric circle with the radius R0 and not included in the concentric circle with the radius R2 to (1−P1−P2). However, $0 \leq P1$, $P2 \leq 1$, and $P1+P2 \leq 1$ are satisfied. Note that three concentric circles are used in this example, a figure with an arbitrary shape and an arbitrary number of figures can be used.

As explained above, according to the present embodiment, the game device 200 can appropriately select a position where an enemy character appears even though an enemy character cannot be arranged at a candidate position where the enemy character is supposed to newly appear, and can prevent the game from becoming too difficult or too easy. Causing an enemy character to appear without largely deteriorating a game balance makes the game more amusing for all players including a beginner player and an expert player, etc. The present embodiment can be easily combined together with the foregoing other embodiments and carried out.

Sixth Embodiment

Next, an explanation will be given of one of the other embodiments of the present invention. The present embodiment is a modified example that changes how to select a candidate when the candidate is selected among multiple candidates of a position when an enemy character is caused to appear. The same structural element as those of the foregoing embodiments will be denoted by the same reference numeral, and the duplicated explanation thereof will be omitted.

The appearance setting unit 204 acquires a moving direction in which the player character moves within a predetermined period from a present time. The appearance setting unit 204 selects a position at random so that candidates present in the acquired direction have a larger probability to be selected, and stores the position of the selected candidate in the memory unit 201 as a position of a new enemy character.

More specifically, the appearance setting unit 204 stores, as history information, a position of the player character in the RAM 103 at a periodical timing like the vertical synchronization interruption of the monitor. The appearance setting unit 204 acquires the moving direction of the player character from the history information.

For example, when a position of the player character at a time T1 is a point PA (X1, Y1, Z1), and a position of the player character at a time T2 after the time T1 is a point PB (X2, Y2, Z2), the appearance setting unit 204 sets the direction of a directional vector (X2−X1, Y2−Y1, Z2−Z1) directed to the point PB from the point PA as the moving direction of the player character.

Note that how to set the moving direction is not limited to the foregoing technique, and other techniques can be used. For example, the appearance setting unit 204 may acquire positions of equal to or greater than three points as a history of positions of the player character, and may acquire the moving direction from the level of the dispersion of those points. It is desirable that a time interval of acquiring a history of positions should be a regular interval, and the time length thereof is optional.

Figure 13:
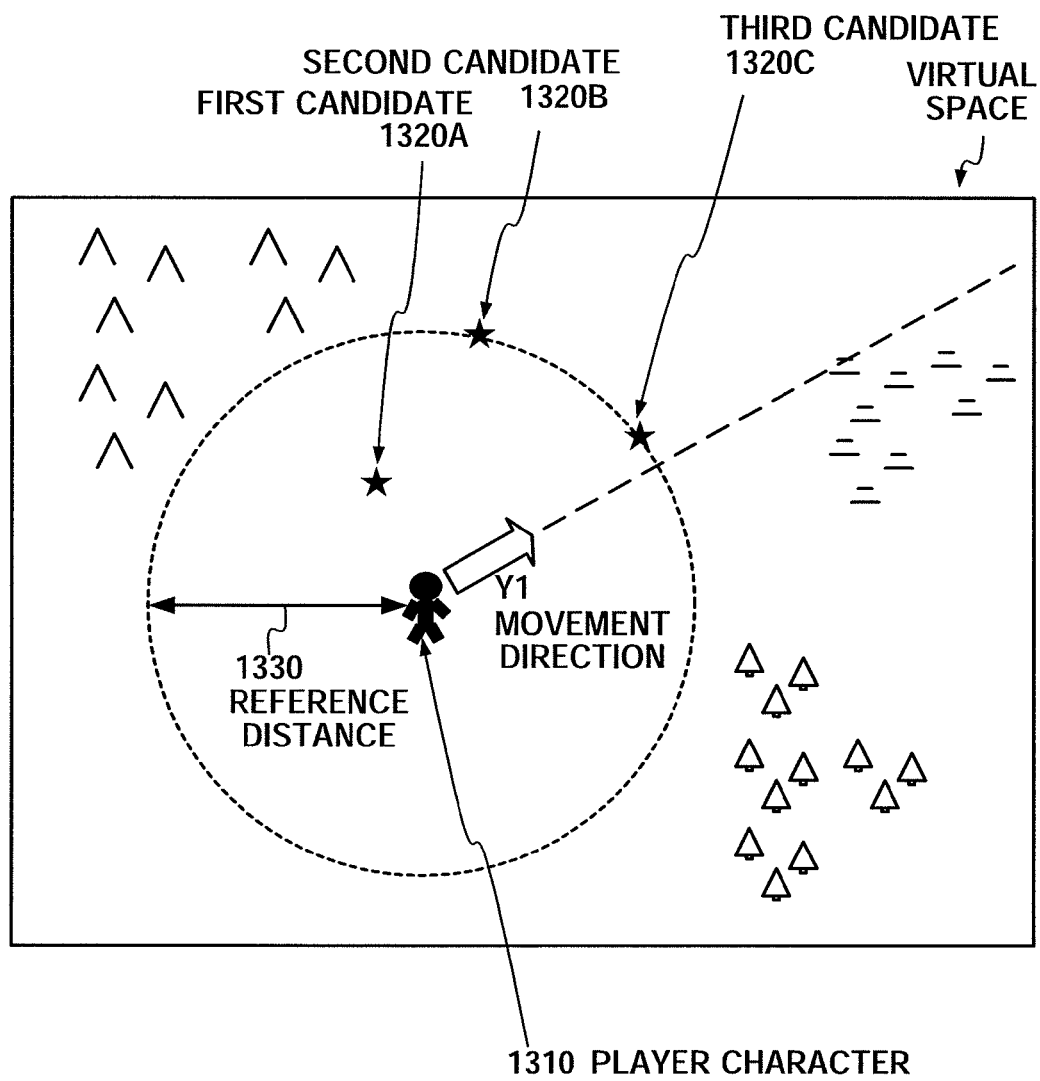
FIG. 13 is a diagram showing an example relation among a reference distance, a candidate of a position where a new enemy character appears, and a moving direction of a player character.

FIG. 13 is a diagram showing a relation between the reference distance, a candidate position where an enemy character newly appears, and the moving direction of the player character. An arrow Y1 in the figure is the moving direction of the player character acquired by the appearance setting unit 204.

First, the measuring unit 202 measures an elapsed time up to a present time after the fighting game is started. The calculating unit 203 acquires a reference distance corresponding to the measured elapsed time. A circle indicated by dashed line in FIG. 13 is a circle having a radius which is the acquired reference distance.

The appearance setting unit 204 selects a candidate closest to the reference distance, i.e., a candidate closest to the circular arc of the circle among the first to third candidates. In the case of FIG. 13, two of the second candidate and the third candidate are selected.

The appearance setting unit 204 sets a weight so that a candidate closer to the moving direction among candidates closest to the reference distance has a larger probability of being selected, and selects a candidate as a position where a new enemy character appears at random.

The appearance setting unit 204 updates the memory unit 201 so that the selected candidate position becomes a position where a new enemy character appears, and the output unit 208 acquires the position of the player character and the position of an enemy character both stored in the memory unit 201, and generates and outputs a game screen in which those characters are arranged at respective positions.

Note that in FIG. 13, a candidate position is indicated by a star, a circle indicating the reference distance is indicated by dashed lines, and the moving direction is indicated by an arrow, those are drawn just for the purpose of explanation, and are not displayed on an actual game screen.

Moreover, the appearance setting unit 204 may set a weigh so that a candidate closer to the moving direction of the player character has a larger probability of being selected and a candidate closer to the reference distance has a larger probability of being selected, and may select a candidate at random.

Note that the appearance setting unit 204 can select a candidate closest to the moving direction as a position where a new enemy appears instead of setting a weight on a probability to be selected and of selecting a candidate at random. The appearance setting unit 204 may set a weight so that a candidate closer to the moving direction has a smaller probability to be selected. Alternatively, the appearance setting unit 204 may set a weight depending on the difference of kinds of an area (e.g., a forest, a grassland, a pond) where an enemy character can appear.

The visual line direction of the player character can be used instead of the moving direction of the player character. That is, the CPU 101 sets a point that the player character arranged in the virtual space views the interior of the virtual space as a view point. A virtual image viewed from the view point toward the visual line direction can be used for, for example, three-dimensional graphics display. The visual line direction can be changed arbitrary through an operation of the controller 105 given by the player.

The appearance setting unit 204 acquires a visual line direction set by the user, sets a weight so that a candidate closer to the visual line direction of the player character has a larger probability of being selected, and selects a candidate at random as a position where a new enemy character appears. The appearance setting unit 204 can select a candidate closest to the moving direction as a position where a new enemy character appears.

The appearance setting unit 204 can cause an enemy character to be more likely to appear in a game screen (within eyesight) viewed from the view point of the player character toward the visual line direction by adopting the visual line. Therefore, the game device 200 can have a game setting that the difficulty level is lowered for a beginner player. The game device 200 can also cause an enemy character to be more likely to appear outside the eyesight of the player character, resulting in a game setting that the difficulty level is increased for an expert player.

As explained above, according to the present embodiment, the game device 200 can cause an enemy character to appear in a direction in which the player character moves, thereby preventing the game from becoming too difficult or too easy. Causing an enemy character to appear without largely deteriorating a game balance makes the game more amusing for all players including a beginner player and an expert player, etc. The present embodiment can be easily combined together with other embodiments, and can be carried out.

Seventh Embodiment

Next, an explanation will be given of one of the other embodiments of the present invention. In the present embodiment, the appearance setting unit 204 changes a position where a next enemy character newly appears so as to be closer or be apart relative to the player character depending on a time up to a present time after an enemy character appears in the virtual space, thereby controlling the difficulty level of the game matching the proficiency level of the player for the game. A detailed explanation will be given below.

Figure 14:
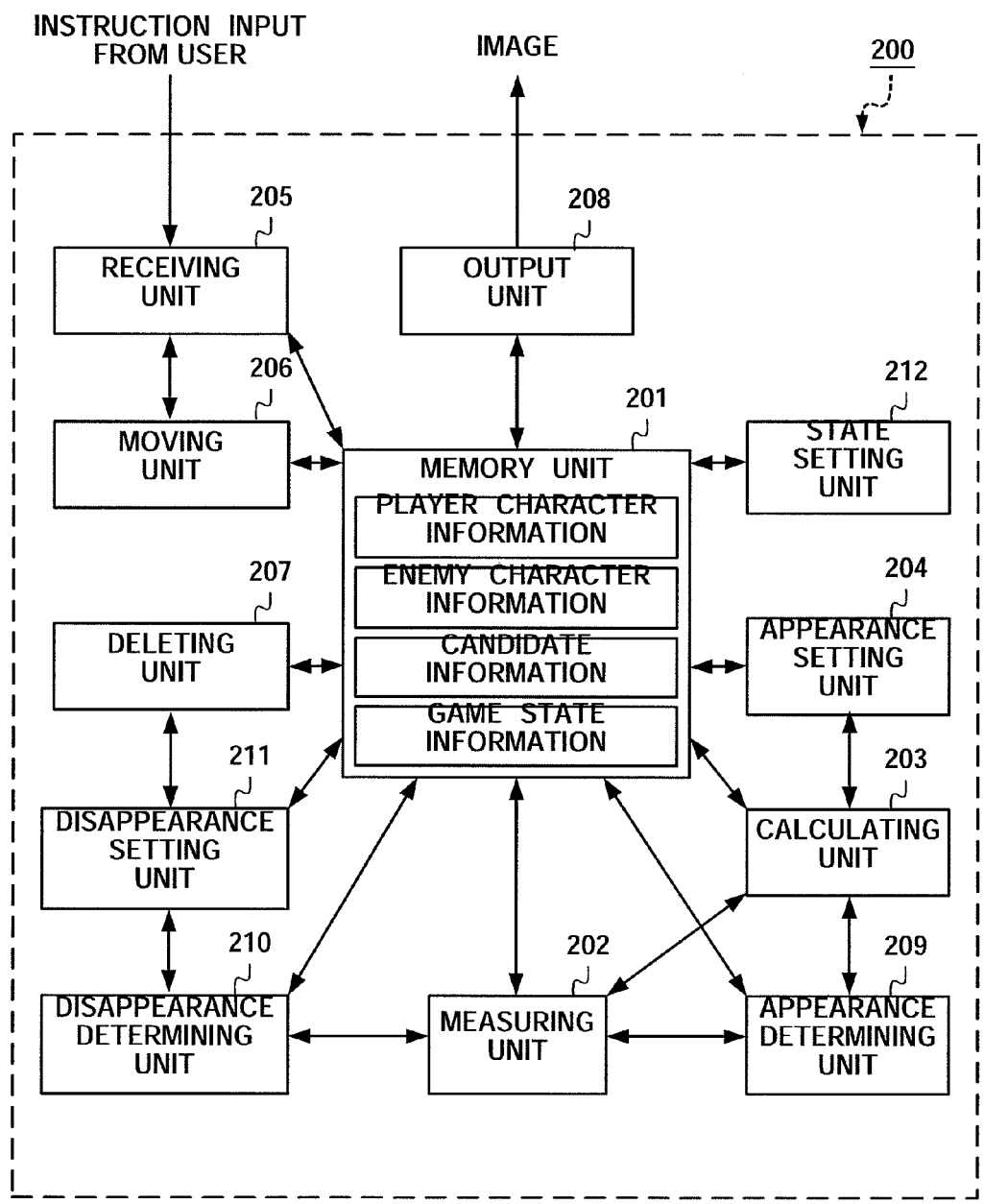
FIG. 14 is a diagram for explaining a functional configuration of a game device according to a seventh embodiment.

FIG. 14 is a diagram for explaining a functional configuration of the game device 200 of the present embodiment. The game device 200 includes the memory unit 201, the measuring unit 202, the calculating unit 203, the appearance setting unit 204, the receiving unit 205, the moving unit 206, the deleting unit 207, the output unit 208, an appearance determining unit 209, a disappearance determining unit 210, a disappearance setting unit 211, and a state setting unit 212.

Figure 15:
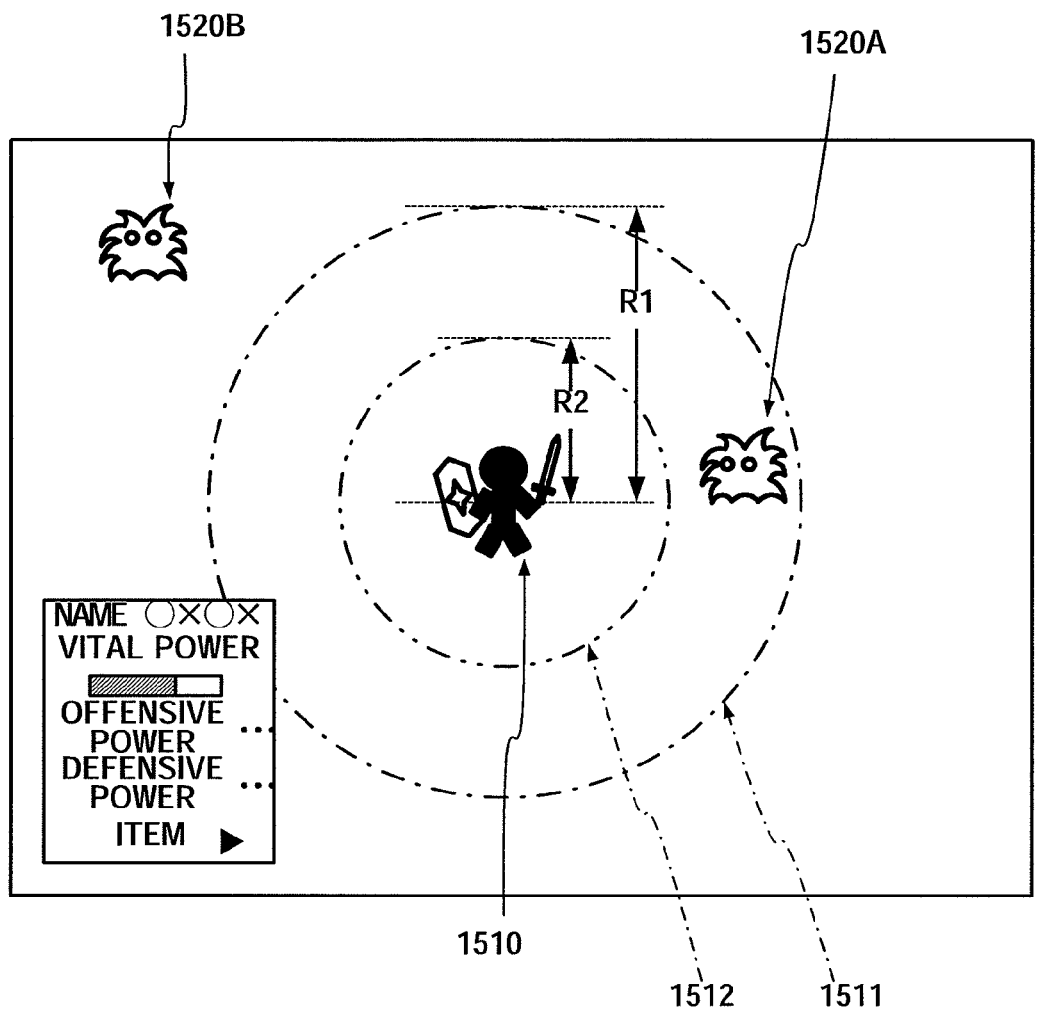
FIG. 15 is a diagram for explaining a positional relation between a player character and an enemy character.

First, a typical game executed by the game device 200 of the present embodiment will be explained with reference to FIG. 15. The virtual space in the game is expressed using, for example, two-dimensional mapping. An explanation will be given below for a two-dimensional space, but a three-dimensional space can be used instead. FIG. 15 shows a display area which is a part of the whole virtual space and which is displayed on the monitor or the like. The display area scrolls in the vertical direction and the horizontal direction together with movement of a player character 1510. That is, FIG. 15 shows only a part of the virtual space. The player operates, for example, a button of the controller 105 to give an instruction of moving a position of the player character 1510, of causing the player character to fight against an enemy character 1520.

Arranged in the virtual space are the player character 1510 operated by the player, and enemy characters 1520 (1520A and 1520B in FIG. 15) having an action controlled by the CPU 101. Attribute parameters like ones indicating an offensive power, a defensive power, a vital power, a physical strength (a so-called a hit point) at the time of fighting against the enemy character 1520 by numerical values are associated with the player character 1510. Likewise, each enemy character 1520 is also associated with attribute parameters, such as an offensive power, a defensive power, a vital power. Multiple kinds of enemy characters 1520 each having a different attribute parameter may be present.

An explanation will be given of a "battle" between the player character and an enemy character in the game presumed in the present embodiment.

For example, in a role-playing game or a fighting game, a player character and/or an enemy character can equip weapons and items, such as a sword, an arrow, a shield, and a protector. The player character attacks the enemy character by wielding a sword or defends itself using a shield in accordance with an instruction from the player. When the player character hits the enemy character while wielding the sword, the attack is successful, and the hit point of the enemy character decreases or the player character wins against the enemy character. Conversely, even though the player character wields the sword but not hit the enemy character, the attack fails, and the hit point of the player character decreases (or may be unchanged) or the player character looses against the enemy character. Moreover, when the player character and the enemy character collide, both or either one of those characters looses a hit point.

For example, in a shooting game, a player character fires a gun or a missile, or dodges any attacking from an opponent character in accordance with an instruction from the player. When the player character fires a gun and hits the opponent character, the hit point of the enemy character decreases or the player character wins against the enemy character. When the player character explodes a bomb within a predetermined range around the enemy character, the hit point of the enemy character decreases or the player character wins against the enemy character.

Note that the same is true for the reversed case in which the player character is switched to an enemy character and the enemy character is switched to the player character. The game content or the definition of the battle explained in this specification are just examples, and are not limited to any particular ones according to the present invention.

The moving unit 206 can move a position of the enemy character 1520 in accordance with the progress of the game. When a distance between the player character 1510 and the enemy character 1520 becomes equal to or less than a first predetermined value R1, the moving unit 206 moves a position of the enemy character 1520 so that the enemy character comes closer to a position of the player character 1510. Typically, when the enemy character 1520 enters in a circle 1511 having a predetermined radius R1 and around the center of the position of the player character 1510, the enemy character 1520 comes closer to the player character 1510.

Alternatively, the moving unit 206 may move the enemy character 1520 in a random-walk manner. For example, when a distance between the player character 1510 and the enemy character 1520 is larger than a first predetermined value R1, the moving unit 206 sets a probability that the enemy character moves to be equal for each direction in which the enemy character 1520 can move, and moves the enemy character at random. Conversely, when the distance between the player character 1510 and the enemy character 1520 is equal to or less than the first predetermined value R1, a probability that the enemy character 1520 moves from a local position to a position of the player character 1510 is set to be relatively high in order to make the movement probabilities unbalanced, thereby moving the enemy character 1520 at random. That is, the enemy character 1520 is likely to come closer to the player character 1510.

The game presumed in the present embodiment includes a battling state in which the player character 1510 battles against the enemy character 1520 at a point and a non-battling state other than the battling state (e.g., the player character 1510 is in a movable state in a field or in a building of the virtual space). In a non-moving state, when the distance between the player character 1510 and the enemy character 1520 becomes equal to or less than a second predetermined value R2 (where R2≦R1), the CPU 101 brings the game into a battling state. Typically, when the enemy character 1520 enters in a circle 1512 having a radius R2 and around the center of the position of the player character 1510, a battle between the player character 1510 and the enemy character 1520 starts.

In the battling state, victory or defeat in the battle depend on the attribute parameters of both characters and an operation input given by the player. For example, when the vital power of the enemy character becomes zero in first, the player character 1510 wins against the enemy character, and the enemy character 1520 disappears from the virtual space.

The first predetermined value R1 and the second predetermined value R2 can be changed arbitrary as far as R2≦R1 is satisfied. Multiple kinds of enemy characters 1520 may be arrange in a field, and the first predetermined value R1 and/or the second predetermined value R2 can be set to a different value for each enemy character 1520. Moreover, the first predetermined value R1 and the second predetermined value R2 can be changed during the game.

The moving speed when the moving unit 206 moves a position of the enemy character 1520 may be variable or unchangeable. When the moving speed is variable, it is desirable to set an upper limit. If there is no upper limit, it becomes not always true that a time up to the player character 1510 becomes in a batting state (starting a battle) against the enemy character 1520 after the enemy character 1520 appears becomes longer and longer as the distance between the player character 1510 and the enemy character 1520 is longer and longer, and there may be a case in which the enemy character 1520 moves closer to the player character 1510 and becomes in a battling state right after the enemy character appears. Conversely, if the upper limit is set, it is possible to control a time up to the player character 1510 becomes in a battling state against the enemy character 1520 after the enemy character 1520 appears to be longer and longer as the distance between the player character 1510 and the enemy character 1520 is longer and longer. Setting the upper limit provides a temporal allowance up to the player character's becoming in a battling state, so that an effect that the game does not become too difficult for a beginner player can be accomplished.

Likewise, a lower limit may be set for the moving speed. If the lower limit is not set, there is a possibility that the enemy character 1520 does not ever come closer to the player character 1510 after the enemy character 1520 appears, and the player character 1510 does not transition to a battling state against the enemy character. If the lower limit is set, however, the game device 200 can control a time up to the player character 1510 transitions to a battling state against the enemy character 1520 after the enemy character 1520 appears to be shorter and shorter as the distance between the player character 1510 and the enemy character 1520 is shorter and shorter. Setting the lower limit enhances an effect that the game does not become too easy for an expert player.

Next, individual units of the game device 200 will be explained.

As shown in FIG. 16A, the memory unit 201 further stores, as enemy character information, an elapsed time up to a present time after an enemy character appears in the virtual space which is measured by the measuring unit 202 in association with identification information of the enemy character and a position of the enemy character. For example, the elapsed time may be stored in a year, a month, a day, an hour, a minute, or a second basis, and may be stored with a unit which is the number of occurrence of an interruption process periodically caused by the CPU 101 of the game device 200, such as a vertical synchronization interruption (VSYNC) or an X-millisecond interruption. An elapsed time stored in the memory unit 201 when an enemy character disappears corresponds to the lifetime of the enemy character.

Like the foregoing embodiments, the memory unit 201 stores a current position of the player character in the virtual space as player character information, and stores a candidate position when an enemy character is caused to newly appear as candidate information.

As will be discussed later, as the disappearance determining unit 209 causes an enemy character to disappear from the virtual space, a record corresponding to the disappearing enemy character among records stored in the memory unit 201 is deleted by the deleting unit 207. The CPU 101 and the RAM 103 work together to function as the memory unit 201.

The measuring unit 202 measures an elapsed time up to a present time after an enemy character appears in the virtual space for each enemy character, and stores the measured elapsed time in the memory unit 201. The CPU 101 works and functions as the measuring unit 202.

For example, when the appearance setting unit 204 stores enemy character information including a position of an enemy character to be newly produced in the memory unit 201 and causes the new enemy character to appear in the virtual space, the measuring unit 202 adds a new record containing an elapsed time up to a present time after the new enemy character appears in the virtual space is zero. Thereafter, the measuring unit 202 adds a predetermined time (e.g., in the case of VSYNC, ⅟60 seconds) to the elapsed time of each record at a timing that a periodical interruption process like VSYNC occurs. As a result, the memory unit 201 stores an elapsed time up to a present time after an enemy character appears enemy character by enemy character.

As shown in FIG. 16B, the memory unit 201 may store information indicating when an enemy character is caused to appear in the virtual space like a clock time when the appearance setting unit 204 causes the enemy character to appear in the virtual space, instead of an elapsed time up to a present time after the enemy character appears in the virtual space. In this case, if a difference between a time when an enemy character appears in the virtual space and a current time is calculated, an elapsed time up to a present time after the enemy character appears in the virtual space can be acquired, so that a process that the measuring unit 202 adds a predetermined time to an elapsed time of each record can be omitted.

Like the foregoing embodiments, the calculating unit 203 calculates, as a reference distance for causing a new enemy character to appear, a distance which increases as an elapsed time stored in the memory unit 201 becomes long. The CPU 101 functions as the calculating unit 203.

The state setting unit 212 sets the game executed by the game device 200 either in the battling state or in the non-battling state, and stores information indicating the set state (game state information) in the memory unit 201. For example, the state setting unit 212 sets the game in the battling state when the distance between the player character and an enemy character is within the second predetermined value R2, and sets the game in a non-battling state in other cases. The CPU 101 and the RAM 103 work together to function as the state setting unit 212.

The appearance determining unit 209 determines whether to cause a new enemy character to appear in the virtual space. The CPU 101 functions as the appearance determining unit 209.

One of the timings that the appearance determining unit 209 determines in order to cause a new enemy character to appear is that the disappearance setting unit 211 to be discussed later causes an enemy character already present to disappear due to a battle or a passage of time limit. That is, when the disappearance setting unit 211 causes at least one enemy character to disappear, the appearance determining unit 209 determines the appearance of at least one new enemy character.

When the total number of enemy character already present in the virtual space does not reach a predetermined upper limit (maximum number) that prohibits production of a new enemy character in the virtual space, the appearance determining unit 209 may determine the appearance of a new enemy character. The appearance determining unit 209 may determine the appearance of an enemy character at random using an arbitrary timing, for example, random numbers. The random numbers may be generated on a case-by-case basis using, for example, a clock time as a seed, or may be generated using a random number table prepared beforehand.

The appearance determining unit 209 may determine the appearance of an enemy character when an attribute parameter value of the player character changes. For example, at a timing that the player character improves its skill so that the offensive power and the defensive power thereof increase, the appearance determining unit 209 may determine the appearance of an enemy character within a range not exceeding the predetermined upper limit.

The appearance determining unit 209 may change the upper limit.

For example, the appearance determining unit 209 changes the upper limit in accordance with a passage of time in the game executed by the game device 200. More specifically, the upper limit is set to be a first upper limit value V1 right after the game is started, but is set to be a second upper limit value V2 when a time T1 elapses after the game is started, and is set to be a third upper limit value when a time T2 further elapses, thereby causing the upper limit to increase or decrease over time. The upper limit may be monotonically increased or decreased relative to a passage of time.

For example, the appearance determining unit 209 decreases the upper limit for a beginner player who is expected to need a longer play time, and increases the upper limit for an expert player who is expected to need a shorter play time. That is, the appearance determining unit 209 can adjust the difficulty level of the game in accordance with the proficiency level of the player.

Note that the appearance determining unit 209 may increase the upper limit more and more for a beginner player when the play time thereof is longer and longer in order to guide the beginner player to improve the player's skill.

A passage of time may be a passage of real time, or may be a passage of time using a virtual date and hour different from real date and hour and set by a program or the like in the game. For example, the game device 200 executes a game having a function of once stopping a time in the game when a command (pause) of temporarily terminating the game is received from the player, and of advancing the time again in the game when a command of resuming the game is received. When it is not in a pausing period, the appearance determining unit 209 may change the upper limit so as to increase or decrease it, but keeps the upper limit unchanged when it is in a pausing period.

The appearance determining unit 209 may change the upper limit in accordance with the number of enemy characters caused to disappear by the disappearance setting unit 211. More specifically, in a battling game, the more the number of enemy characters caused to disappear by battling within a predetermined time is, the more the upper limit is increased. That is, it can be assumed that the more the total number of enemy characters caused to disappear per unit time is, the higher the game proficiency of the player is, so that the appearance determining unit 209 may produce more enemy characters. Conversely, it can be assumed that the smaller the total number of enemy characters caused to disappear per unit time is, the lower the game proficiency of the player is, so that the appearance determining unit 209 suppresses the number of enemy characters to be produced.

Furthermore, the appearance determining unit 209 may increase the upper limit at a timing that the player character improves its skill so that attribute parameters advantageous for the player, such as an offensive power and a defensive power, increase, and may determine to cause an enemy character to appear within a range not exceeding the increased maximum number. Alternatively, the upper limit may be reduced at a timing that the player character is damaged so that the attribute parameters, such as an offensive power and a defensive power, decrease, and the appearance determining unit may determine to cause an enemy character to appear within a range not exceeding the reduced upper limit.

As a result of reducing the upper limit, when the total number of enemy characters already present in the game exceeds the new upper limit, the disappearance determining unit 209 may cause enemy characters by what corresponds to the exceeding number to disappear, or the moving unit 206 may move enemy characters by what corresponds to the exceeding number apart from the position of the player character. As the upper limit of the number of enemy characters is changed in accordance with the proficiency level of the player in this fashion, the game device 200 can adjust the difficulty level of the game.

The appearance determining unit 209 may change a timing that an enemy character is caused to appear in accordance with the proficiency level of the player. For example, the longer the elapsed time (the lifetime of an enemy character) stored in the memory unit 201 is, the more the appearance determining unit 209 sets back a timing that a new enemy character appears.

More specifically, when an elapsed time T indicated by a record corresponding to an enemy character caused to disappear most recently by the disappearance setting unit 211 is within a first predetermined range ($T1 \leq T < T2$), the appearance determining unit 209 determines to cause a new enemy character to appear right after the disappearance setting unit 211 causes an enemy character to disappear. Moreover, when it is within a second predetermined range ($T2 \leq T < T3$, but $T1 < T2 < T3$), the appearance determining unit 209 determines to cause a new enemy character to appear when a predetermined extension elapses after the disappearance setting unit 211 causes one enemy character to disappear.

That is, when an elapsed time stored in the memory unit 201 is long, it can be assumed that the proficiency level of the player is not high or the player character is not strong, the appearance determining unit 209 determines to cause a new enemy character to appear when a certain time elapses after an enemy character is defeated. Conversely, when the elapsed time stored in the memory unit 201 is short, it can be assumed that the proficiency level of the player is high or the player character is strong, the appearance determining unit 209 determines to cause a new enemy character to appear right after an enemy character is defeated.

When the appearance determining unit 209 determines to cause a new enemy character to appear, the appearance setting unit 204 stores, in the memory unit 201, a candidate position having a distance to the player character stored in the memory unit 201 and closest to the reference distance calculated by the calculating unit 203 as a position of an enemy character caused to newly appear among candidate positions where an enemy character is supposed to appear and which is indicated by candidate information stored in the memory unit 201. Thereafter, the appearance setting unit 204 causes a new enemy character to appear. The CPU 101 and the RAM 103 work together to function as the appearance setting unit 204.

The game device 200 executes, for example, a role-playing game in which enemy characters are present in a field, a dungeon, and the like, and which advances as a player character acquires a particular item or reaches an exit while keeping battling against enemy characters. When an enemy character C1 already present disappears because of a battle against the player character, the calculating unit 203 reads out an elapsed time associated with the disappearing enemy character C1 and temporarily stores it before the deleting unit 207 deletes a record corresponding to the disappearing enemy character C1. The elapsed time corresponds to the lifetime of the disappearing enemy character C1. Moreover, the calculating unit 203 calculates a reference distance which becomes longer as the read-out elapsed time is longer (so that the reference distance monotonically increases relative to the elapsed time). The appearance setting unit 204 causes a new enemy character to appear at a candidate position closest to the reference distance calculated by the calculating unit 203.

That is, the longer the lifetime of an enemy character is, the farther a position where a next enemy character appears is set from the position of the player character. For example, when the game proficiency level of the player like a beginner player is low (not good at the game), or when the offensive power of the player character is low, there is a general tendency that the lifetime of an enemy character becomes long, so that a new enemy character appears at a position apart from the player character. Therefore, it is possible for the game device 200 to prevent enemy characters from frequently appearing near the player character while the proficiency level of the player is yet low and to prevent the game being currently executed from becoming too difficult for a beginner player.

The shorter the lifetime of an enemy character is, the closer a position where a next enemy character appears is set to the position of the player character. For example, when the game proficiency level of the player like an expert player is high (pretty good at the game) or when the offensive power of the player character is high, there is a general tendency that the lifetime of an enemy character becomes short, so that an enemy character is likely to appear near the player character. Accordingly, it is possible for the game device 200 to prevent enemy characters from appearing frequently positions apart from the player character when the proficiency level of the player is high, and to prevent the game being currently executed from becoming too easy for an expert player.

For example, the longer an elapsed time associated with an enemy character having disappeared at a time closest to a present time (most recently) is, the longer a reference distance is set by the calculating unit 203. When the number of enemy characters having disappeared at a time closest to the present time is one, it is appropriate that the calculating unit 203 calculates a reference distance using an elapsed time associated with that enemy character. Moreover, when the number of disappearing enemy characters is equal to or greater than two, it is appropriate if the calculating unit 203 calculates a reference distance using an elapsed time associated with any one of those enemy characters or an average of respective elapsed times.

For example, the calculating unit 203 calculates an average of respective elapsed times associated with a predetermined number of enemy characters having disappeared most recently. A value to be calculated corresponds to an average lifetime of the predetermined number of enemy characters having disappeared most recently. The longer the calculated lifetime is, the longer the reference distance may be set.

The receiving unit 205 receives an instruction input given by the user through the controller 105. For example, when receiving an instruction input of moving a position of the player character, the receiving unit 205 notifies the received instruction input to the moving unit 206. The CPU 101, the RAM 103, and the controller 105 work together to function as the receiving unit 205.

The moving unit 206 moves a position of the player character in accordance with an instruction input received by the receiving unit 205, and updates the position of the player character stored in the memory unit 201. The moving unit 206 also moves a position of an enemy character in accordance with the advancement of the game. For example, as explained above, when the distance between the player character and an enemy character becomes equal to or less than the first predetermined value R1, the moving unit 206 moves the position of the enemy character so that the enemy character comes closer to the position of the player character. The CPU 101 and the RAM 103 work together to function as the moving unit 206.

The disappearance determining unit 210 determines, for each character, whether to cause an enemy character already present to disappear from the virtual space. A timing that an enemy character is caused to appear in the virtual space is caused to disappear varies. For example, in a battling state, when the player character wins the battle, the disappearance determining unit 210 determines to cause the lost enemy character to disappear. That is, as a result of the battle between the player character and the enemy character, when a predetermined attribute parameter (a so-called vital power, physical strength, hit point, or the like) of the enemy character becomes zero in first, the enemy character loses the battle, and the disappearance determining unit 210 determines to cause the enemy character to disappear.

As a result of movement of the player character in the virtual space, when an enemy character already present is located too far away from the player character so that the enemy character hardly contacts the player character or cannot be displayed within the screen, presence of that enemy character becomes meaningless. Accordingly, the disappearance determining unit 210 determines to cause that enemy character to disappear.

Weapons, such as, for example, a time bomb, which explodes and disappears when a time limit elapses after it appears (it is activated) can be set as enemy characters. The disappearance determining unit 210 determines to cause such automatic-disappearing type enemy character to disappear from the screen when an elapsed time measured by the measuring unit 202 up to a present time after such a character has appeared reaches a time limit. The CPU 101 works and functions as the disappearance determining unit 210.

When the disappearance determining unit 210 determines to cause an enemy character to disappear, the disappearance setting unit 211 deletes the enemy character from the screen. The CPU 101, the RAM 103 and the image processor 108 work together to function as the disappearance setting unit 211.

The deleting unit 207 deletes a record corresponding to an enemy character caused to disappear by the disappearance setting unit 211 among enemy character information stored in the memory unit 201. The CPU 101 and the RAM 103 work together to function as the deleting unit 207.

The output unit 208 reads out a position of the player character and that of an enemy character both stored in the memory unit 201, and outputs an image of the player character and that of the enemy character at respective read-out positions. The CPU 101, the RAM 103, and the image processor 108 work together to function as the output unit 208.

Figure 17:
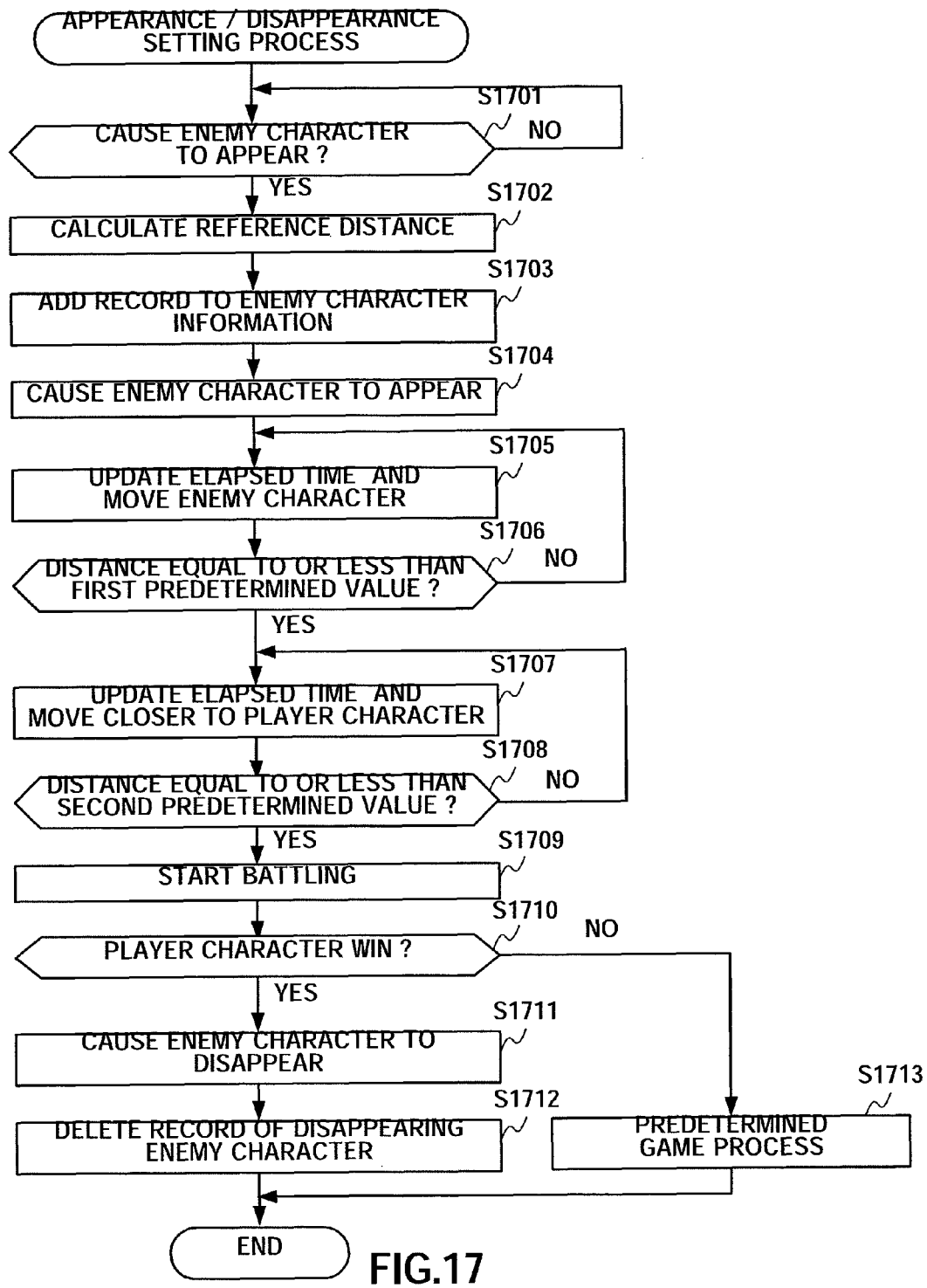
FIG. 17 is a flowchart for explaining an appearance/disappearance setting process.

Next, an explanation will be given of an appearance/disappearance setting process of the present embodiment with reference to the flowchart of FIG. 17. This flowchart shows a "life" of an enemy character until the enemy character disappears after it has appeared.

First, the appearance setting unit 204 determines whether to cause an enemy character to appear in the virtual space (step S1701). As explained above, the appearance setting unit 204 can carry out such determination based on, for example, whether an enemy character already present is caused to disappear by a battle, or whether the total number of enemy characters already present reaches the predetermined maximum number.

When it is determined that enemy character ought not to appear (step S1701: NO), the game device 200 stands by until a the next time that a new enemy character is caused to appear.

When it is determined that an enemy character ought to appear (step S1701: YES), the calculating unit 203 calculates a reference distance based on an elapsed time stored in the memory unit 201 (step S1702).

The appearance setting unit 204 adds a record, including a candidate position closest to the reference distance calculated by the calculating unit 203 as a position where an enemy character appears, to enemy character information (step S1703), and causes an enemy character to appear (step S1704).

The game device 200 sets an initial value of an elapsed time corresponding to an enemy character right after that enemy character is caused to newly appear to be zero, and counts up the elapsed time as needed in a process to be discussed later. The elapsed time to be calculated is an elapsed time up to a present time after the enemy character has appeared.

The moving unit 206 updates an elapsed time indicated by the enemy character information in the memory unit 201, and moves a position of the enemy character (step S1705). The moving unit 206 determines whether the distance between the position of the player character and the position of the enemy character is equal to or less than the foregoing predetermined value R1 (step S1706). As explained above, the first predetermined value R1 is a value used for determining whether to move the position of the enemy character already present so that the enemy character comes closer to the position of the player character.

For example, the game device 200 periodically executes the process from the step S1705 to the step S1706 for each VSYNC. The moving unit 206 updates an elapsed time and a position both associated with the enemy character for each VSYNC.

When the distance between the position of the player character and the position of the enemy character is not equal to or less than the first predetermined value R1 (step S1706: NO), the process returns to the step S1705.

Conversely, when the distance between the position of the player character and the position of the enemy character is equal to or less than the first predetermined value R1 (step S1706: YES), the moving unit 206 moves the position of the enemy character so that the enemy character comes closer to the position of the player character (step S1707), and updates a position indicated by the enemy character information.

Next, the moving unit 206 determines whether the distance between the position of the player character and the position of the enemy character is equal to or less than the foregoing second predetermined value R2 (step S1708). As explained above, the second predetermined value R2 is a value used for determining whether the enemy character already present and the player character transition into a battling state.

For example, the game device 200 periodically executes the process from the step S1707 to the step S1708 for each VSYNC. The moving unit 206 updates an elapsed time and a position both associated with the enemy character for each VSYNC.

When the distance between the position of the player character and the position of the enemy character is not equal to or less than the second predetermined value R2 (step S1708: NO), the process returns to the step S1707.

Conversely, when the distance between the position of the player character and the position of the enemy character is equal to or less than the second predetermined value R2 (step S1708: YES), the CPU 101 transitions the game into a battling state to start a battle between the player character and the enemy character (step S1709). The victory or defeat of the player character is set through this battle. Note that the kind of staging the game device 200 executes during the battling state is not limited to any particular staging according to the present invention.

As a result of the battle, when the player character wins (step S1710: YES), the disappearance setting unit 211 causes the opponent enemy character (lost enemy character) to disappear from the virtual space (step S1711). Thereafter, the deleting unit 207 deletes a record corresponding to the disappearing enemy character from the enemy character information in the memory unit 201 (step S1712).

When the player character does not win (step S1710: NO), the CPU 101 executes a predetermined game process, such as staging of the defeat of the player character or the draw of the battle, termination of the game, or starting over of the game (step S1713), and terminates the appearance/disappearance setting process.

As explained above, according to the present embodiment, the game proficiency of the player is estimated in accordance with a time until an enemy character is defeated after it has appeared, i.e., the lifetime of the enemy character, and a position where a new enemy character appears is set to be near the player character or to be apart from the player character. Accordingly, the game device 200 can adjust the game so that the game does not become too difficult for a beginner player and not become too easy for an expert player.

Figure 18:
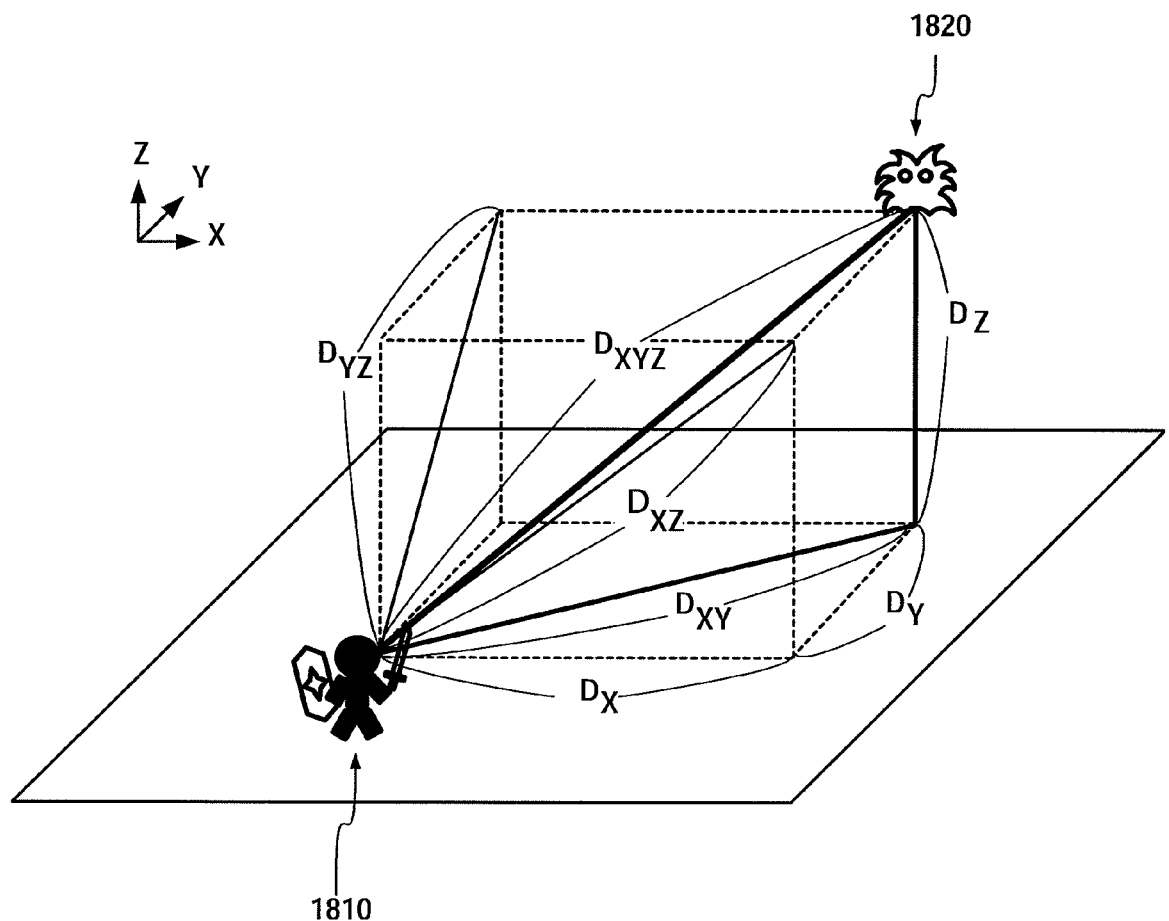
FIG. 18 is a diagram for explaining a distance between a position of a player character and a position of an enemy character.

The present invention has been explained in consideration of a two-dimensional virtual space, but the virtual space may be one-dimensional or three dimensional. As shown in FIG. 18, for example, when a three-dimensional Cartesian coordinate system is used, a distance DXYZ taken into consideration of all three axial directions can be used as a distance between the position of a player character 1810 and the position of an enemy character 1820. Alternatively, any of specific directional components DX, DY, DZ, DXY, DXZ, and DYZ of the distance DXYZ may be used instead.

Eighth Embodiment

Next, an explanation will be given of one of the other embodiments of the present invention. In the present embodiment, the longer the battling time (fighting time) of the player character and an enemy character, the closer or farther the position of the next enemy character's appearance changes relative to the player character. The present embodiment will be explained in more detail below.

As shown in FIG. 19, the memory unit 201 of the present embodiment further stores, as enemy character information, a time (a battle start time) that the player character transitions into a battling state against an enemy character in association with the identification information of the enemy character and the position of the enemy character. The moving unit 206 stores, as a battle start time, a time that the player character and/or the enemy character is moved so that the distance between the position of the player character and the position of the enemy character becomes equal to or less than the second predetermined value R2 in the memory unit 201.

The calculating unit 203 calculates, as a reference distance for causing a new enemy character to appear, a distance which becomes longer as a time until the player character wins against the enemy character after it becomes in a battling state becomes longer. That is, the longer the battle time until the battling state ends after the state becomes in the battling state is, the longer the reference distance is set by the calculating unit 203, and the shorter the battling time is, the shorter the reference distance is set by the calculating unit 203.

A time needed for the player character to win against the enemy character is typically a difference between a time that the moving unit 206 moves the player character and/or the enemy character so that the distance between the position of the player character and the position of the enemy character becomes equal to or less than the second predetermined value R2 (a battle start time stored in the memory unit 201) and a time that the enemy character is caused to disappear by the disappearance setting unit 211.

For example, the longer the battling time of the player character against an enemy character which has disappeared at a time nearest the present time (most recently), the longer the reference distance is set by the calculating unit 203.

For example, the calculating unit 203 calculates an average (average battle time) battle time of the player character against a predetermined number of enemy characters which have disappeared most recently. The longer the calculated average battle time becomes, the longer the reference distance may be set.

The appearance setting unit 204 stores, as a position where an enemy character newly appears, in the memory unit 201, a candidate position having a distance to a position of the player character stored in the memory unit 201 closest to the reference distance calculated by the calculating unit 203 among candidates of a position where an enemy character is caused to appear and which are indicated by candidate information stored in the memory unit 201. Thereafter, the appearance setting unit 204 causes a new enemy character to appear.

That is, the longer it takes to defeat an enemy character so that the enemy character is deleted after a battle starts, the farther the initial position of the next appearing enemy character is set from the position of the player character. For example, when the game proficiency of the player like a beginner player is low (not good at the game) or when the offensive power of the player character is low, the time needed to defeat the enemy character after a battle starts tends to be long, so that a new enemy character is likely to appear at a position apart from the player character. Therefore, the game device 200 can adjust the game to prevent enemy characters from sequentially appearing only near the player character when the proficiency level of the player is still low, and to prevent the game from becoming too difficult for a beginner player.

Moreover, the shorter the time needed to defeat an enemy character and to delete the enemy character after a battle starts, the closer the initial position of the next appearing enemy character to the position of the player character. For example, when the game proficiency of the player like an expert player is high (pretty good at the game), or when the offensive power of the player character is high, the lifetime of an enemy character tends to be short, so that an enemy character is likely to appear at a position near the player character. Accordingly, the game device 200 can adjust the game to prevent enemy characters from appearing merely positions apart from the player character when the proficiency level of the player is high, and to prevent the game from becoming too easy for an expert player.

Like the present embodiment, in the case of a game including a battling state and a non-battling state, the calculating unit 203 may take a total time that the player character is in a battling state against any one of the enemy characters (or a total time that the player character is not in a non-battling state) as a battling time (fighting time) of the player character against an enemy character.

For example, the game device 200 executes a game which has a function of once stopping (pausing) a time in the game when a predetermined command of temporary interrupting the game is received from the player or the like, and of advancing the time again when a predetermined command of resuming the game is received from the player or the like. The game device 200 may recognize a pausing period as a non-battling state, and recognize other periods as a battling state. That is, the game device 200 may take a time in the game that an attribute parameter is possibly changed through a battle as a battling state.

The present invention is not limited to the foregoing embodiments, and can be changed and modified in various forms. Individual structural elements of the foregoing embodiments can be freely combined together.

In each of the foregoing embodiments, the appearance setting unit 204 selects a position where an enemy character is to appear, but the present invention is not limited to this case, and can be applied to a method of selecting a position where not only an enemy character but also any other optional character objects are to appear. The above-explained enemy character includes a character object possibly exerting any negative effect on the player character, such as a land mine, a gimmick, a trap, or an obstacle.

In each of the foregoing embodiments, the appearance setting unit 204 selects one position as a position where an enemy character appears, but can select equal to or greater than M number of (M is an integer equal to or greater than two) positions. In this case, in the step S604, the appearance setting unit 204 selects upper M number of candidates closest to the reference distance among all candidates stored in the memory unit 201, and sets the selected M number of positions as positions where respective enemy characters appear. It is desirable that the selected M number of positions should be sufficiently apart from one another so as not to overlap when enemy characters are arranged.

In each of the foregoing embodiments, there is one player character present, but multiple player characters may be present so that multiple players can participate the game.

A program which allows the game device 200 to function as a part of or a whole device may be distributed with such a program being stored in a computer-readable recording medium, such as a memory card, a CD-ROM, a DVD, or an MO (Magneto Optical disk), and installed in another computer to function that computer as the foregoing means or to cause that computer to execute the foregoing steps.

The program may be stored in a disk device of a server device over the Internet, and may be superimposed on a carrier wave to allow a computer to download such a program, etc.

This application claims the benefit of Japanese Patent Application No. 2007-330637, the entire disclosure of which is herein incorporated by reference.

INDUSTRIAL APPLICABILITY

As explained above, according to the present invention, there are provided a game device, a game processing method, an information recording medium, and a program which are appropriate for adjusting a game so that the game does not become too difficult or too easy for a player.

The invention claimed is:

1. A device comprising:
   a memory unit which stores a position of a player character moving in a virtual space in accordance with an instruction from a player, a position of an enemy character, and candidates of a new position where a new enemy character is to appear in the virtual space;
   a measuring unit which measures an elapsed time from a time when the enemy character appears in the virtual space up to a time when the new enemy character is to appear in the virtual space and stores the measured elapsed time in the memory unit;
   a calculating unit which calculates a distance monotonically increasing relative to the stored elapsed time;
   an appearance determining unit which determines whether to cause a new enemy character to appear in the virtual space; and
   an appearance setting unit which, when the appearance determining unit determines to cause the new enemy character to appear:
   selects one of the candidates which has a distance from the player character which is closest to the calculated distance, and
   stores the selected one of the candidates as the new position where the new enemy character is to appear causes the new enemy character to appear at the new position.

2. The device according to claim 1, wherein the calculating unit calculates an average elapsed time associated with respective enemy characters present in the virtual space, and calculates a distance that monotonically increases relative to the calculated average.

3. The device according to claim 1, wherein the calculating unit calculates a distance that monotonically increases relative to a longest elapsed time among elapsed times associated with respective enemy characters present in the virtual space.

4. The device according to claim 1, wherein the calculating unit calculates a distance which monotonically increases relative to a shortest elapsed time among elapsed times associated with respective enemy characters present in the virtual space.

5. A device, comprising:
   a memory unit which stores a position of a player character moving in a virtual space in accordance with an instruction from a player, a position of an enemy character, and candidates of a new position where a new enemy character is to appear in the virtual space;
   a measuring unit which measures an elapsed time from a time when the enemy character appears in the virtual space up to a time when the new enemy character is to appear in the virtual space and stores the measured elapsed time in the memory unit;
   a calculating unit which calculates a distance monotonically increasing relative to the stored elapsed time;
   an appearance determining unit which determines whether to cause a new enemy character to appear in the virtual space;
   an appearance setting unit which, when the appearance determining unit determines to cause the new enemy character to appear: selects one of the candidates which has a distance from the player character which is closest to the calculated distance, and stores the selected one of the candidates as the new position where the new enemy character is to appear causes the new enemy character to appear at the new position;
   a state setting unit which causes the player character to be in a battling state when a position of an enemy character is within a predetermined distance range from a position of the player character, and causes the player character to be in a non-battling state in other cases;
   a disappearance determining unit which determines whether to cause the enemy character to disappear based on an instruction input from the player when the player character is in a battling state; and
   a disappearance setting unit which causes the enemy character to disappear from the virtual space when the disappearance determining unit determines to cause the enemy character to disappear.

6. The device according to claim 5, wherein the appearance determining unit determines to cause a new enemy character to appear when the disappearance setting unit causes an enemy character to disappear.

7. The device according to claim 5, wherein the appearance determining unit determines whether to cause a new enemy character to appear using a random number.

8. The device according to claim 5, wherein the appearance determining unit determines to cause a new enemy character to appear when a total number of enemy characters present in the virtual space is less than a predetermined upper limit.

9. The device according to claim 8, wherein the appearance determining unit changes the upper limit in accordance with an elapsed time in a game executed by the game device.

10. The device according to claim 8, wherein the appearance determining unit changes the upper limit in accordance with a number of enemy characters caused to disappear by the disappearance setting unit.

11. The device according to claim 5, wherein the memory unit stores an elapsed time until the disappearance setting unit causes an enemy character to disappear after the state setting unit causes the enemy character to be in a battling state, instead of storing an elapsed time up to a present time after the enemy character has appeared in the virtual space.

12. The device according to claim 1, further comprising a moving unit which, when a distance between the position of the player character and the position of the enemy character is equal to or less than a predetermined value, moves a position of an enemy character so that the enemy character comes closer to a position of the player character and updates the position of the enemy character stored in the memory unit.

13. A device, comprising:
   a memory unit which stores a position of a player character moving in a virtual space in accordance with an instruction from a player, a position of an enemy character, and candidates of a new position where a new enemy character is to appear in the virtual space;
   a measuring unit which measures an elapsed time from a time when the enemy character appears in the virtual space up to a time when the new enemy character is to appear in the virtual space and stores the measured elapsed time in the memory unit;
   a calculating unit which calculates a distance monotonically increasing relative to the stored elapsed time;
   an appearance determining unit which determines whether to cause a new enemy character to appear in the virtual space;
   an appearance setting unit which, when the appearance determining unit determines to cause the new enemy character to appear: selects one of the candidates which has a distance from the player character which is closest to the calculated distance, and stores the selected one of the candidates as the new position where the new enemy character is to appear causes the new enemy character to appear at the new position; and, a moving unit which moves a position of an enemy character at random, and updates the position of the enemy character stored in the memory unit, while at the same time, (a) sets a probability that the enemy character moves toward a direction of a position of the player character from the position of the enemy character to be relatively larger than a probability that the enemy character moves in other directions when a distance between the position of the player character and the position of the enemy character is equal to or less than a predetermined value, and (b) sets the probability that the enemy character moves toward the direction of the position of the player character from the position of the enemy character to be equal to the probability that the enemy character moves in other directions when the distance between the position of the player character and the position of the enemy character is greater than the predetermined value.

14. The device according to claim 12, wherein the moving unit moves an enemy character at a speed equal to or slower than a predetermined maximum moving speed.

15. The device according to claim 12, wherein the moving unit moves an enemy character at a speed equal to or faster than a predetermined minimum moving speed.

16. A processing method executed by a game device including a memory unit, the memory unit storing a position of a player character moving in a virtual space in accordance with an instruction from a player, a position of an enemy character, and candidates of a new position where a new enemy character is to appear in the virtual space, the method comprising:

a measuring step of measuring an elapsed time from a time when the enemy character appears in the virtual space up to a time when the new enemy character is to appear in the virtual space and storing the measured elapsed time in the memory unit;

a calculating step of calculating a distance monotonically increasing relative to the stored elapsed time;

an appearance determining step of determining whether to cause a new enemy character to appear in the virtual space; and an appearance setting step of, when it is determined in the appearance determining step to cause the new enemy character to appear: selecting one of the candidates which has a distance from the player character which is closest to the calculated distance, and storing the selected one of the candidates as the new position where the new enemy character is to appear causes the new enemy character to appear at the new position.

17. A computer-readable information recording medium storing a program that allows a computer to function as:

a memory unit which stores a position of a player character moving in a virtual space in accordance with an instruction from a player, a position of an enemy character, and candidates of a position where a new enemy character is to appear in the virtual space;

a measuring unit which measures an elapsed time from a time when the enemy character appears in the virtual space up to a time when the new enemy character is to appear in the virtual space and stores the measured elapsed time in the memory unit;

a calculating unit which calculates a distance monotonically increasing relative to the stored elapsed time;

an appearance determining unit which determines whether to cause a new enemy character to appear in the virtual space; and an appearance setting unit which, when the appearance determining unit determines to cause the new enemy character to appear:

selects one of the candidates which has a distance from the player character which is closest to the calculated distance, and stores the selected one of the candidates as the new position where the new enemy character is to appear causes the new enemy character to appear at the new position.

18. A program that allows a computer to function as:

a memory unit which stores a position of a player character moving in a virtual space in accordance with an instruction from a player, a position of an enemy character and candidates of a new position where a new enemy character is to appear in the virtual space;

a measuring unit which measures an elapsed time from a time when the enemy character appears in the virtual space up to a time when the new enemy character is to appear in the virtual space and stores the measured elapsed time in the memory unit;

a calculating unit which calculates a distance monotonically increasing relative to the stored elapsed time;

an appearance determining unit which determines whether to cause a new enemy character to appear in the virtual space; and an appearance setting unit which, when the appearance determining unit determines to cause the new enemy character to appear:

selects one of the candidates which has a distance from the player character which is closest to the calculated distance, and stores the selected one of the candidates as the new position where the new enemy character is to appear causes the new enemy character to appear at the new position.

* * * * *